(12) United States Patent
Hirose et al.

(10) Patent No.: US 8,396,919 B2
(45) Date of Patent: *Mar. 12, 2013

(54) HYPERTEXT DISPLAYING APPARATUS AND HYPERTEXT DISPLAYING PROGRAM

(75) Inventors: Takako Hirose, Hirataka (JP); Takuya Kobayashi, Neyagawa (JP); Masakazu Kawano, Habikino (JP); Atsunobu Kato, Ebina (JP)

(73) Assignee: Panasonic Corporation, Osaka (JP)

( * ) Notice: Subject to any disclaimer, the term of this patent is extended or adjusted under 35 U.S.C. 154(b) by 1423 days.

This patent is subject to a terminal disclaimer.

(21) Appl. No.: 12/071,248

(22) Filed: Feb. 19, 2008

(65) Prior Publication Data

US 2008/0250027 A1  Oct. 9, 2008

Related U.S. Application Data

(63) Continuation of application No. 10/046,820, filed on Jan. 17, 2002, now Pat. No. 7,398,303.

(30) Foreign Application Priority Data

Jan. 19, 2001 (JP) ................................. 2001-011251

(51) Int. Cl.
 G06F 15/16  (2006.01)
(52) U.S. Cl. ........................................ 709/203; 709/218
(58) Field of Classification Search .................. 709/203, 709/218

See application file for complete search history.

(56) References Cited

U.S. PATENT DOCUMENTS

| | | | |
|---|---|---|---|
| 5,873,100 A | 2/1999 | Adams et al. | |
| 5,913,215 A | 6/1999 | Rubinstein et al. | |
| 5,987,476 A | 11/1999 | Imai et al. | |
| 6,012,093 A | 1/2000 | Maddalozzo, Jr. et al. | |
| 6,067,552 A * | 5/2000 | Yu | 715/234 |
| 6,133,916 A | 10/2000 | Bukszar et al. | |
| 6,209,036 B1 | 3/2001 | Aldred et al. | |
| 6,219,679 B1 | 4/2001 | Brisebois et al. | |
| 6,460,060 B1 | 10/2002 | Maddalozzo et al. | |
| 6,473,788 B1 * | 10/2002 | Kim et al. | 709/209 |
| 6,476,833 B1 * | 11/2002 | Moshfeghi | 715/854 |
| 6,493,703 B1 * | 12/2002 | Knight et al. | 709/206 |
| 6,571,234 B1 * | 5/2003 | Knight et al. | 709/206 |
| 6,625,581 B1 * | 9/2003 | Perkowski | 709/200 |
| 6,643,641 B1 * | 11/2003 | Snyder | 709/218 |
| 6,667,751 B1 | 12/2003 | Wynn et al. | |
| 6,754,485 B1 | 6/2004 | Obradovich et al. | |
| 6,763,496 B1 * | 7/2004 | Hennings et al. | 709/207 |
| 6,961,712 B1 * | 11/2005 | Perkowski | 709/200 |

(Continued)

OTHER PUBLICATIONS

L. Tauscher et al., "How people revisit web pages: empirical findings and implications for the design of history systems," International Journal of Human-Computer Studies, Academic Press, New York, NY, US, vol. 47, No. 1, Jul. 1997, pp. 97-137, XP002101195.

(Continued)

*Primary Examiner* — Minh-Chau Nguyen
(74) *Attorney, Agent, or Firm* — Wenderoth, Lind & Ponack, L.L.P.

(57) ABSTRACT

A hypertext displaying apparatus in which when a link destination indicated in stored data is designated, a processing section instructs a transmission/reception section to download hypertext data at the link destination. Additionally, the processing section instructs a history storage section to register an identifier of the currently-displayed stored data. If a user indicates a "previous content" instruction, the processing section reads from a stored information storage section the stored data corresponding to the identifier registered in the history information storage section, so that the stored data is displayed on a screen.

10 Claims, 22 Drawing Sheets

U.S. PATENT DOCUMENTS

| | | |
|---|---|---|
| 7,007,237 B1 | 2/2006 | Sharpe |
| 7,035,909 B1 | 4/2006 | Lee et al. |
| 7,200,640 B1 * | 4/2007 | Cole et al. .................... 709/217 |
| 2001/0044310 A1 | 11/2001 | Linck |

OTHER PUBLICATIONS

Ayers et al., "Using Graphic History in Browsing the World Wide Web," Proceedings of the International Conference on World Wide Web, Dec. 1995, pp. 451-459, XP002082850.

M. Bieber et al., "Fourth generation hypermedia: some missing links for the World Wide Web," International Journal of Human-Computer Studies, Academic Press, New York, NY, US, vol. 47, No. 1, Jul. 1997, pp. 31-65, XP002101194.

M. F. Kaashoek et al., "Dynamic Documents: Mobile Wireless Access to the WWW," Proceedings, Workshop on Mobile Computing Systems and Applications, IEEE Computer Society Press, Los Alamitos, CA, US, Dec. 8, 1994, pp. 179-184, XP000605997.

Linda Tauscher and Saul Greenberg, "How people revisit web pages: empirical findings and implications for the design of history systems", 1997, Academic Press Limited, 47, 97-137.

* cited by examiner

| IDENTIFIER (ID) | ACQUISITION SOURCE URI | TIME/DATE OF STORAGE | STORED AREA ADDRESS | DATA SIZE |
|---|---|---|---|---|
| ID1 | http://www.test.co.jp/add/doc.html | 1999/04/20 09:45 | add11 | len11 |
| ID2 | http://www.test.co.jp/lib/readme.html | 1999/04/15 01:15 | add12 | len12 |
| ID3 | http://www.patent.or.jp/report/rep5.html | 1999/03/10 10:10 | add13 | len13 |
| ID4 | http://www.patent.or.jp/report/rep3.html | 1999/03/22 15:30 | add14 | len14 |
| ... | ... | ... | ... | ... |

FIG. 5

| ACQUISITION SOURCE URI | LAST TIME/DATE OF DISPLAY | IDENTIFIER (ID) |
|---|---|---|
| http://www.test.co.jp/index.html | 1999/04/20 09:45 | NULL |
| http://www.test.co.jp/local/news.html | 1999/04/15 01:15 | NULL |
| http://www.patent.or.jp/report/rep5.html | 1999/04/02 18:02 | ID3 |
| http://www.patent.or.jp/report/rep1.html | 1999/03/30 17:30 | NULL |
| ... | ... | ... |

ORDER OF DISPLAY →

| ACQUISITION SOURCE URI | TIME/DATE OF CREATION | STORED AREA ADDRESS | DATA SIZE |
|---|---|---|---|
| http://www.test.co.jp/index.html | 1999/04/20 09:45 | add1 | len1 |
| http://www.test.co.jp/local/news.html | 1999/04/15 01:15 | add2 | len2 |
| http://www.patent.or.jp/report/main.html | 1999/04/02 18:02 | add3 | len3 |
| http://www.patent.or.jp/report/rep1.html | 1999/03/30 17:30 | add4 | len4 |
| ... | ... | ... | ... |

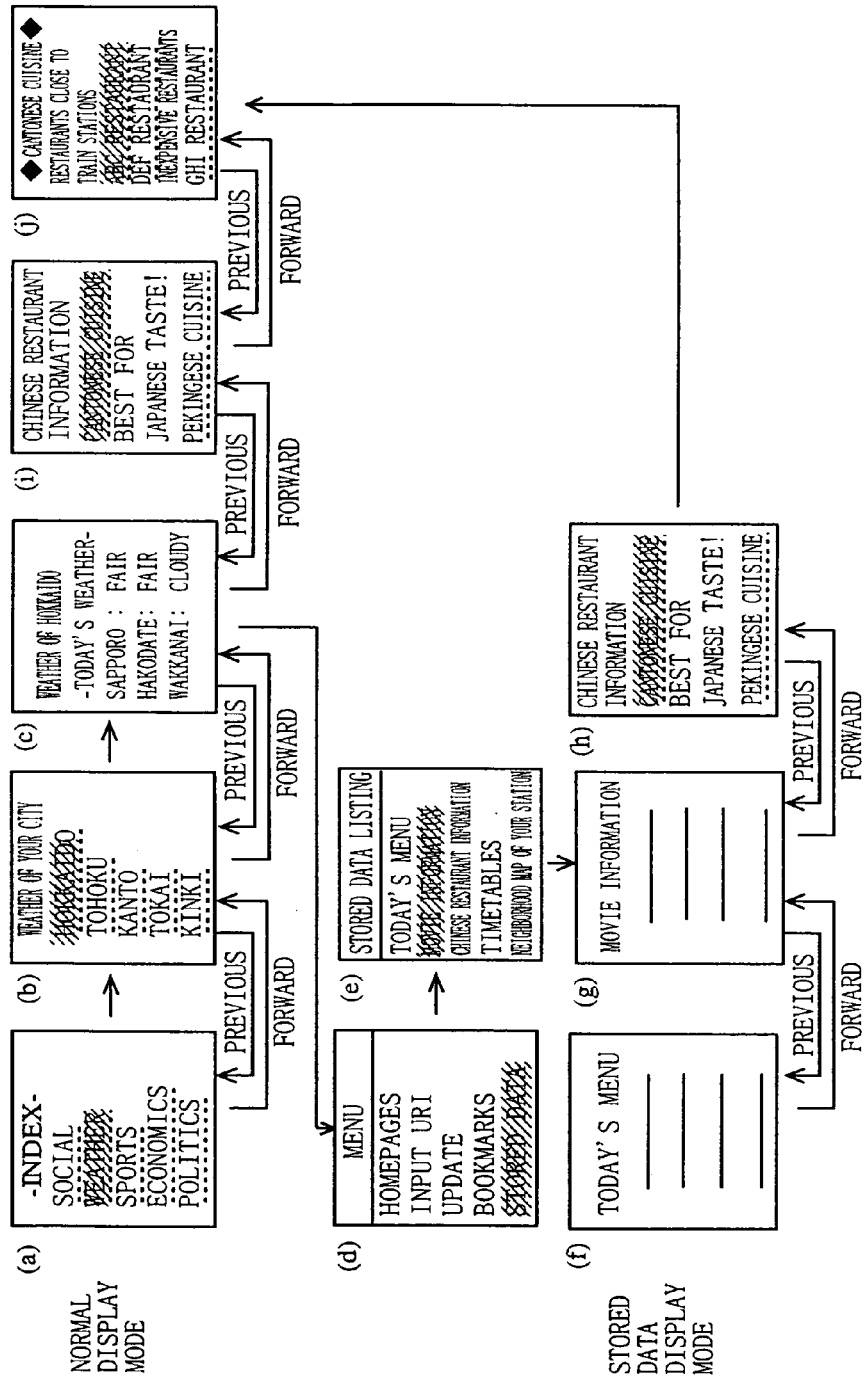

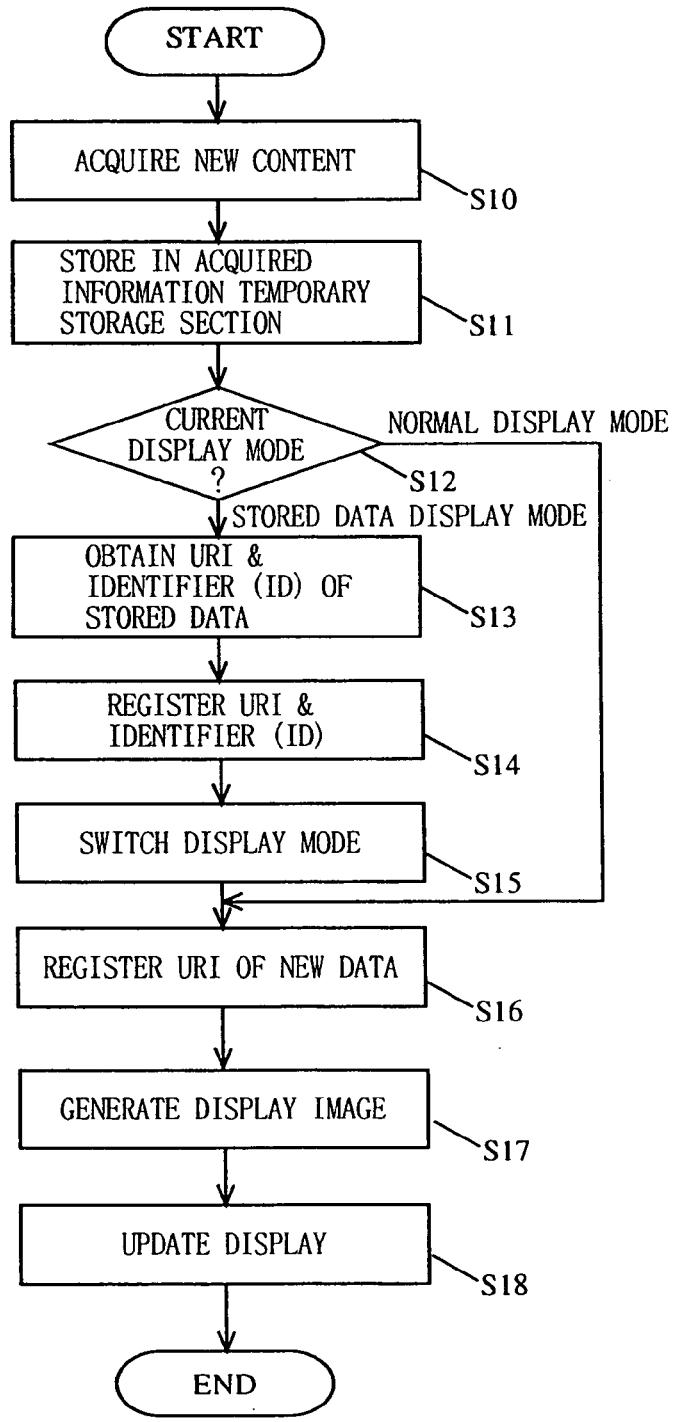

| ACQUISITION SOURCE URI | TIME/DATE OF CREATION | STORED AREA ADDRESS | DATA SIZE | IDENTIFIER (ID) |
|---|---|---|---|---|
| http://www.test.co.jp/index.html | 1999/04/20 09:45 | add1 | len1 | NULL |
| http://www.test.co.jp/local/news.html | 1999/04/15 01:15 | add2 | len2 | NULL |
| http://www.patent.or.jp/report/rep5.html | 1999/04/02 18:02 | NULL | NULL | ID3 |
| http://www.patent.or.jp/report/rep1.html | 1999/03/30 17:30 | add4 | len4 | NULL |
| ... | ... | ... | ... | ... |

HYPERTEXT DISPLAYING APPARATUS AND HYPERTEXT DISPLAYING PROGRAM

This application is a continuation application of Ser. No. 10/046,820, filed Jan. 17, 2002 now U.S. Pat. No. 7,398,303.

BACKGROUND OF THE INVENTION

1. Field of the Invention

The present invention relates to a hypertext displaying apparatus for displaying information acquired from a server as images on a screen, and more particularly, to a hypertext displaying apparatus which is capable of displaying such images in accordance with a history thereof.

2. Description of the Background Art

Recent advances in information technologies have made it possible for a user of such technologies to instantaneously acquire various information over the Internet by designating an address such as a URI (Uniform Resource Identifier) of a location which the user desires to access. Such information may be in the form of images, text, and/or sounds, etc. The acquired information is typically in the form of a hypertext described in HTML (HyperText Markup Language), etc. By using a hypertext displaying apparatus, which runs a program generally referred to as a "browser", a user can request to acquire hypertext data from a server and display the hypertext data acquired from the server as an image on the screen. Examples of conventionally available browsers include Netscape Navigator® and Internet Explorer®.

Conventional hypertext displaying apparatuses are capable of retaining an order in which a number of images are displayed. The order may be referred to as history information. When a user presses a "previous" button, the hypertext displaying apparatus redisplays the most recently displayed hypertext data. When a "forward" button is further pressed while an image in response to the "previous" button is being redisplayed, the hypertext displaying apparatus redisplays the originally-displayed hypertext data, i.e., the hypertext data which was being displayed before the pressing of the "previous" button.

In early days, such hypertext displaying apparatuses were mostly implemented by means of personal computers or the like. Recently, however, mobile terminals for personal use, e.g., mobile phones, are being used increasingly more to implement hypertext displaying apparatuses. Such mobile terminals allow users to access the Internet by wire or wireless, and acquire information as desired.

FIG. 20 is a diagram illustrating a transition of exemplary images which may be displayed by a conventional hypertext displaying apparatus in the form of a mobile terminal. This conventional hypertext displaying apparatus includes a "previous" button, a "forward" button, and a "menu" button. The "previous" button and the "forward" button are used for displaying data on a screen in accordance with a displaying history thereof. The "menu" button is used to display a menu image for allowing a user to select from various functions.

In (a) of FIG. 20, the mobile terminal is shown as displaying an image of a content on the screen. Hereinafter, a hypertext displaying apparatus or an image displayed thereon will be said to be in a "normal display mode" when the hypertext displaying apparatus is displaying an image representing a content acquired fresh from a server on a network, i.e., as opposed to any data stored in the hypertext displaying apparatus. Next, if a user selects a link destination (i.e., "weather" in this example), the hypertext displaying apparatus acquires new hypertext data which is provided at the link destination over the Internet, and displays an image representing the newly acquired data (see (b) of FIG. 20). If the user selects a further link destination (i.e., "Hokkaido" in this example), the hypertext displaying apparatus newly acquires further hypertext data, and displays an image representing the acquired data (see (c) of FIG. 20). The hypertext displaying apparatus temporarily stores any hypertext data which were once acquired under the normal display mode into a cache memory, in the order in which the hypertext data were displayed.

As shown in (a) to (c) of FIG. 20, if the user presses the "previous" button at any point under the normal display mode, the hypertext displaying apparatus retrieves from the cache memory the data (if any) which was most recently being displayed on the screen just prior to a currently-displayed hypertext data, and displays an image representing the retrieved data. If the user presses the "forward" button at any point under the normal display mode, the hypertext displaying apparatus retrieves from the cache memory the data (if any) which has been displayed on the screen immediately after the currently-displayed hypertext data, and displays an image representing the retrieved data.

Thus, by pressing either the "previous" button or the "forward" button, the user can easily allow once-displayed hypertext data to be redisplayed on the screen.

As shown in (d) of FIG. 20, if the user presses the "menu" button, the hypertext displaying apparatus displays a menu image for allowing the user to select from various functions.

In order to realize the function of allowing hypertext data which has once been downloaded from a server to be viewed at any time, the hypertext displaying apparatus includes a memory for retaining such hypertext data as "stored data". As a result, the user can read any desired data that is in the memory, whereby it becomes possible to obtain desired information faster than having to access the Internet to newly acquire it. Even if any content data on a server is deleted for some reason, the content data, once stored, can always be later viewed as stored data. Furthermore, the stored data will remain stored even after the Hypertext displaying apparatus is turned off (unlike any downloaded data which is temporarily-stored in a cache memory, which will be lost once the apparatus is turned off), so that the stored data can be viewed the next time the hypertext displaying apparatus is turned on.

FIG. 21 is a diagram illustrating a transition of exemplary images that are displayed by the conventional hypertext displaying apparatus when stored data is read. First, as has been described with reference to FIG. 20, a user presses the "menu" button to evoke a menu image (see (a) of FIG. 21). Next, the user selects "stored data" in the menu image. As a result, the hypertext displaying apparatus displays a listing of stored data (see (b) of FIG. 21).

If the user selects an item corresponding to desired information in the image of the listing of stored data, then the hypertext displaying program reads the stored data concerning that information from the memory, and displays an image representing that information (see (d) of FIG. 21). Hereinafter, when a hypertext displaying apparatus is displaying an image representing stored data, the hypertext displaying apparatus or the displayed image will be said to be in a "stored data display mode".

If the user presses the "forward" button under the stored data display mode, then the hypertext displaying apparatus displays an image representing the stored data (if any) which lies immediately subsequent to the currently-displayed stored data, in accordance with the order described in the stored data listing (see (e) of FIG. 21). If the user presses the "previous" button, then the hypertext displaying apparatus displays an image representing the stored data (if any) which lies immediately previous to the currently-displayed stored data, in accordance with the order described in the stored data listing (see (c) of FIG. 21).

Thus, the user can allow a number of stored data to be displayed on the screen one after another in the aforementioned manner. If the user selects a link destination indicated in any given stored data under the stored data display mode, then the hypertext displaying apparatus accesses that link destination over the Internet to newly download hypertext data therefrom, and the downloaded hypertext data is displayed on the screen (see (f) of FIG. 21). Thus, starting from the stored data, the user can obtain more detailed information. Once hypertext data has been newly downloaded over the Internet, the hypertext displaying apparatus switches its display mode from the stored data display mode to the normal display mode.

As described above, mobile terminals having a function of retaining once-acquired information as stored data are becoming increasingly more prevalent. One example is a class of mobile phones which are designed to support i-Mode® services. A function which is provided in such mobile phones, called "screen memo", corresponds to the aforementioned function of retaining stored data.

However, since the screen of a mobile terminal is generally small, it is practically impossible to have any stored data and newly-downloaded content displayed together within the same image. Therefore, if a user who has selected a link destination indicated in given stored data to download new hypertext data later desires to redisplay the given stored data, the user must access a listing of stored data from the menu image to recall the stored data. Especially if there is a very large number of stored data, it may be difficult to successfully reselect once-displayed stored data.

As mentioned above, the hypertext displaying apparatus has the function of displaying previous and/or subsequent images in accordance with a history thereof by pressing the "previous" button and/or the "forward" button. This function may mislead the user into believing that he or she should be able to redisplay the stored data as well, by similarly operating the "previous" button and/or the "forward" button. In actuality, however, the aforementioned function alone does not allow the once-displayed stored data to be redisplayed. In this respect, the conventional hypertext displaying apparatus has a problem in that a user thereof cannot operate the apparatus in an instinctive manner, but rather feels that the required operation is cumbersome.

FIG. 22 is a diagram illustrating a transition of exemplary images displayed by the conventional hypertext displaying apparatus, which better describes the problem associated therewith. Descriptions of any portions overlapping with the operations already described with reference to FIGS. 20 and 21 will be omitted. If the user designates a link destination "Cantonese cuisine" indicated in the stored data (see (a) of FIG. 22), the hypertext displaying apparatus displays detailed information associated with this link destination (see (b) of FIG. 22). In (b) of FIG. 22, the user will instinctively feel that the image of (a) will be redisplayed after pressing the "previous" button. In actuality, however, pressing the "previous" button will only result in the image of (c) being displayed because the image of (c) is stored in the cache memory of the hypertext displaying apparatus.

SUMMARY OF THE INVENTION

Therefore, an object of the present invention is to provide a hypertext displaying apparatus which, after a user designates a link destination indicated in stored data in order to acquire and display new data at the link destination from a server device, still allows the originally-displayed stored data to be easily redisplayed.

The present invention has the following features to attain the object above.

A first aspect of the present invention is directed to a hypertext displaying apparatus for downloading hypertext data from a server device coupled to the hypertext display apparatus via a network and displaying a content represented by the hypertext data. The hypertext displaying apparatus comprises: download means for downloading, when a link destination is designated, hypertext data at the designated link destination from the server device via the network; stored data storage means for storing, among the hypertext data having been downloaded by the download means, hypertext data requested by a user; display means for displaying a content represented by hypertext data stored in the stored data storage means or a content represented by hypertext data which is newly downloaded by the download means; displaying history storage means for storing a displaying history of at least one content represented by the hypertext data newly downloaded by the download means, where the displaying history is in accordance with an order in which the at least one content is displayed by the display means; and redisplaying order control means for controlling, in accordance with the displaying history stored in the history storage means, an order in which contents are redisplayed by the display means. When a content at a link destination indicated in a source content represented by the hypertext data stored in the stored data storage means is newly displayed by the display means, the displaying history storage means stores a displaying history of the source content and one or more ensuing contents, where the displaying history is in accordance with an order in which the source content and the one or more ensuing contents are displayed by the display means. Further, the redisplaying order control means allows contents to be redisplayed by the display means in a sequential manner, at least back to the source content.

In accordance with the above structure of the present invention, when a user designates a link destination indicated in a content which is represented by stored hypertext data, the content (hereinafter referred to as a "source content") in which the link destination is indicated is stored as part of a displaying history. Thus, as history displaying instructions, e.g., a "previous content" instruction and/or a "forward content" instruction, are given by a user, contents can be redisplayed in a sequential manner at least back to the source content. As a result, after the user designates a link destination indicated in a stored content in order to acquire and display new data at the link destination from a server device, the originally-displayed stored content can still be easily redisplayed.

According to a second aspect of the present invention based on the first aspect, the stored data storage means assigns an identifier to each unit of hypertext data stored therein, where the identifier is used for identifying a stored area of the hypertext data. Further, in the displaying history stored in the displaying history storage means, the source content is described in the form of an identifier assigned thereto.

Thus, according to the second aspect, it is possible to easily locate a stored area of hypertext data representing a source content.

According to a third aspect of the present invention based on the second aspect, the hypertext displaying apparatus further comprises stored data deletion means for deleting hypertext data stored in the stored data storage means in accordance with an instruction given by the user. For each unit of hypertext data stored, the stored data storage means stores an identifier and an acquisition source address of the hypertext data indicating an address of the hypertext data on the network. In the displaying history stored in the displaying history storage means, the source content is described in the form of an identifier assigned thereto and an acquisition source address of the hypertext data representing the source content. If the hypertext data representing a source content to be redisplayed has been deleted by the stored data deletion means, the redisplaying order control means instructs the download means to again download the hypertext data representing the source content based on the acquisition source address, so that the downloaded hypertext data is displayed by the display means.

Thus, according to the third aspect, even if hypertext data representing a source content has been deleted from the hypertext display apparatus, the hypertext data can be downloaded again so that the source content can be successfully redisplayed.

According to a fourth aspect of the present invention based on the third aspect, the hypertext displaying apparatus further comprises identicalness determination means for determining identicalness between the hypertext data representing a source content to be redisplayed and the hypertext data stored in the stored data storage means which corresponds to the identifier assigned to the hypertext data representing the source content. When the identicalness determination means denies identicalness between the hypertext data associated with the source content, the redisplaying order control means instructs the download means to again download the hypertext data representing the source content based on the acquisition source address, so that the downloaded hypertext data is displayed by the display means.

Thus, according to the fourth aspect, identicalness of hypertext data associated with a source content is determined so as to allow a source content desired by a user to be redisplayed even if the hypertext data associated therewith has been updated or otherwise altered.

According to a fifth of the present invention based on the fourth aspect, the identicalness determination means determines identicalness between the hypertext data associated with the source content based on the acquisition source address.

Thus, according to the fifth aspect, the identicalness determination can be easily made by using an acquisition source address.

According to a sixth aspect of the present invention based on the first aspect, the hypertext displaying apparatus further comprises temporary storage means for temporarily storing hypertext data newly downloaded by the download means, and for temporarily storing, when a content at a link destination indicated in a source content represented by the hypertext data stored in the stored data storage means is newly displayed by the display means, the hypertext data representing the source content. Further, the redisplaying order control means instructs the display means to redisplay a content based on the hypertext data stored in the temporary storage means.

Thus, according to the sixth aspect, a source content can be redisplayed based on temporarily-stored data. Therefore, even if hypertext data representing a source content to be redisplayed has been deleted or otherwise altered, the source content can be successfully redisplayed.

According to a seventh aspect of the present invention based on the sixth aspect, the temporary storage means is operative not to store the same hypertext data in a redundant manner.

Thus, according to the seventh aspect, the same hypertext data is prevented from being stored in a redundant manner. As a result, the utility of the temporary storage area is improved.

According to an eighth aspect of the present invention based on the sixth aspect, the temporary storage means is operative to temporarily store only a latest version of any given hypertext data.

Thus, according to the eighth aspect, only the latest version of any given hypertext data will be temporarily stored, so that old versions of hypertext data are prevented from being mingled with the latest version of hypertext data. As a result, the utility of the temporary storage area is improved, and any confusion concerning displayed contents due to storage of newer and older versions of hypertext data can be prevented.

According to a ninth aspect of the present invention based on the first aspect, the hypertext displaying apparatus further comprises stored data deletion means for deleting hypertext data stored in the stored data storage means in accordance with an instruction given by the user. The stored data deletion means is operative not to delete the hypertext data when the hypertext data has been registered in the displaying history storage means.

Thus, according to the ninth aspect, if a source content is registered as part of a displaying history, the hypertext data representing that content is not deleted from the hypertext displaying apparatus. As a result, it is possible to forestall a situation where no hypertext data is available in the hypertext displaying apparatus although the hypertext data is registered in the displaying history. Thus, stored data can be redisplayed with an increased certainty.

According to a tenth aspect of the present invention based on the first aspect, the stored data storage means assigns an identifier to each unit of hypertext data stored therein, where the identifier is used for identifying a stored area of the hypertext data. The hypertext displaying apparatus further comprises temporary storage means for temporarily storing a URI of hypertext data newly downloaded by the download means, and for temporarily storing an identifier and a URI of the hypertext data representing the source content. When displaying a content represented by the hypertext data stored in the stored data storage means as instructed by the redisplaying order control means, the display means reads the hypertext data from the stored data storage means based on the identifier of the hypertext data stored in the temporary storage means, thereby displaying the content represented by the hypertext data.

Thus, according to the tenth aspect, it is possible to easily locate a stored area of hypertext data representing a source content.

An eleventh aspect of the present invention is directed to a hypertext displaying program embodied on a medium readable by a hypertext displaying apparatus for downloading hypertext data from a server device coupled to the hypertext display apparatus via a network and displaying a content represented by the hypertext data. The hypertext displaying program comprises, comprising: a download step of downloading, when a link destination is designated, hypertext data at the designated link destination from the server device via the network; a stored data storage step of storing, among the hypertext data having been downloaded by the download step, hypertext data requested by a user; a display step of displaying a content represented by hypertext data stored by the stored data storage step or a content represented by hypertext data which is newly downloaded by the download step; a displaying history storage step of storing a displaying history of at least one content represented by the hypertext data newly downloaded by the download step, where the displaying history is in accordance with an order in which the at least one content is displayed by the display step; and a redisplaying order control step of controlling, in accordance with the displaying history stored by the history storage step, an order in which contents are redisplayed by the display step. When a content at a link destination indicated in a source content represented by the hypertext data stored by the stored data storage step is newly displayed by the display step, the displaying history storage step stores a displaying history of the source content and one or more ensuing contents, where the displaying history is in accordance with an order in which the source content and the one or more ensuing contents are displayed by the display step. Further, the redisplaying order control step allows contents to be redisplayed by the display step in a sequential manner, at least back to the source content.

According to a twelfth aspect of the present invention based on the eleventh aspect, the stored data storage step assigns an identifier to each unit of hypertext data stored therein, where the identifier is used for identifying a stored area of the hypertext data. Further, in the displaying history stored by the displaying history storage step, the source content is described in the form of an identifier assigned thereto.

According to a thirteenth aspect of the present invention based on the twelfth aspect, the hypertext displaying program further comprises a stored data deletion step of deleting hypertext data stored by the stored data storage step in accordance with an instruction given by the user. For each unit of hypertext data stored, the stored data storage step stores an identifier and an acquisition source address of the hypertext data indicating an address of the hypertext data on the network. In the displaying history stored by the displaying history storage step, the source content is described in the form of an identifier assigned thereto and an acquisition source address of the hypertext data representing the source content. If the hypertext data representing a source content to be redisplayed has been deleted by the stored data deletion step, the redisplaying order control step instructs the download step to again download the hypertext data representing the source content based on the acquisition source address, so that the downloaded hypertext data is displayed by the display step.

According to a fourteenth aspect of the present invention based on the thirteenth aspect, the hypertext displaying program further comprises an identicalness determination step of determining identicalness between the hypertext data representing a source content to be redisplayed and the hypertext data stored by the stored data storage step which corresponds to the identifier assigned to the hypertext data representing the source content. When the identicalness determination step denies identicalness between the hypertext data associated with the source content, the redisplaying order control step instructs the download step to again download the hypertext data representing the source content based on the acquisition source address, so that the downloaded hypertext data is displayed by the display step.

According to a fifteenth aspect of the present invention based on the fourteenth aspect, the identicalness determination step determines identicalness between the hypertext data associated with the source content based on the acquisition source address.

According to a sixteenth aspect of the present invention based on the eleventh aspect, the hypertext displaying program further comprises a temporary storage step of temporarily storing hypertext data newly downloaded by the download step, and temporarily storing, when a content at a link destination indicated in a source content represented by the hypertext data stored by the stored data storage step is newly displayed by the display step, the hypertext data representing the source content. Further, the redisplaying order control step instructs the display step to redisplay a content based on the hypertext data stored by the temporary storage step.

According to a seventeenth aspect of the present invention based on the sixteenth aspect, the temporary storage step does not store the same hypertext data in a redundant manner.

According to an eighteenth aspect of the present invention based on the sixteenth aspect, the temporary storage step temporarily stores only a latest version of any given hypertext data.

According to a nineteenth aspect of the present invention based on the eleventh aspect, the hypertext displaying program further comprises a stored data deletion step of deleting hypertext data stored by the stored data storage step in accordance with an instruction given by the user. The stored data deletion step does not delete the hypertext data when the hypertext data has been registered by the displaying history storage step.

According to a twentieth aspect of the present invention based on the eleventh aspect, the stored data storage step assigns an identifier to each unit of hypertext data stored therein, where the identifier is used for identifying a stored area of the hypertext data. The hypertext displaying apparatus further comprises a temporary storage step of temporarily storing a URI of hypertext data newly downloaded by the download step, and temporarily storing an identifier and a URI of the hypertext data representing the source content. When displaying a content represented by the hypertext data stored by the stored data storage step in accordance with an instruction from the redisplaying order control step, the display step reads the hypertext data stored by the stored data storage step based on the identifier of the hypertext data stored by the temporary storage step, thereby displaying the content represented by the hypertext data.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram illustrating exemplary data stored in a history information storage section 110;

FIG. 7 is a diagram illustrating a transition of exemplary images displayed by the hypertext displaying apparatus 100;

FIG. 8 is a flowchart illustrating an operation of the hypertext displaying apparatus 100 when receiving a new content acquisition instruction;

DETAILED DESCRIPTION OF THE INVENTION

First Embodiment

Figure 1:
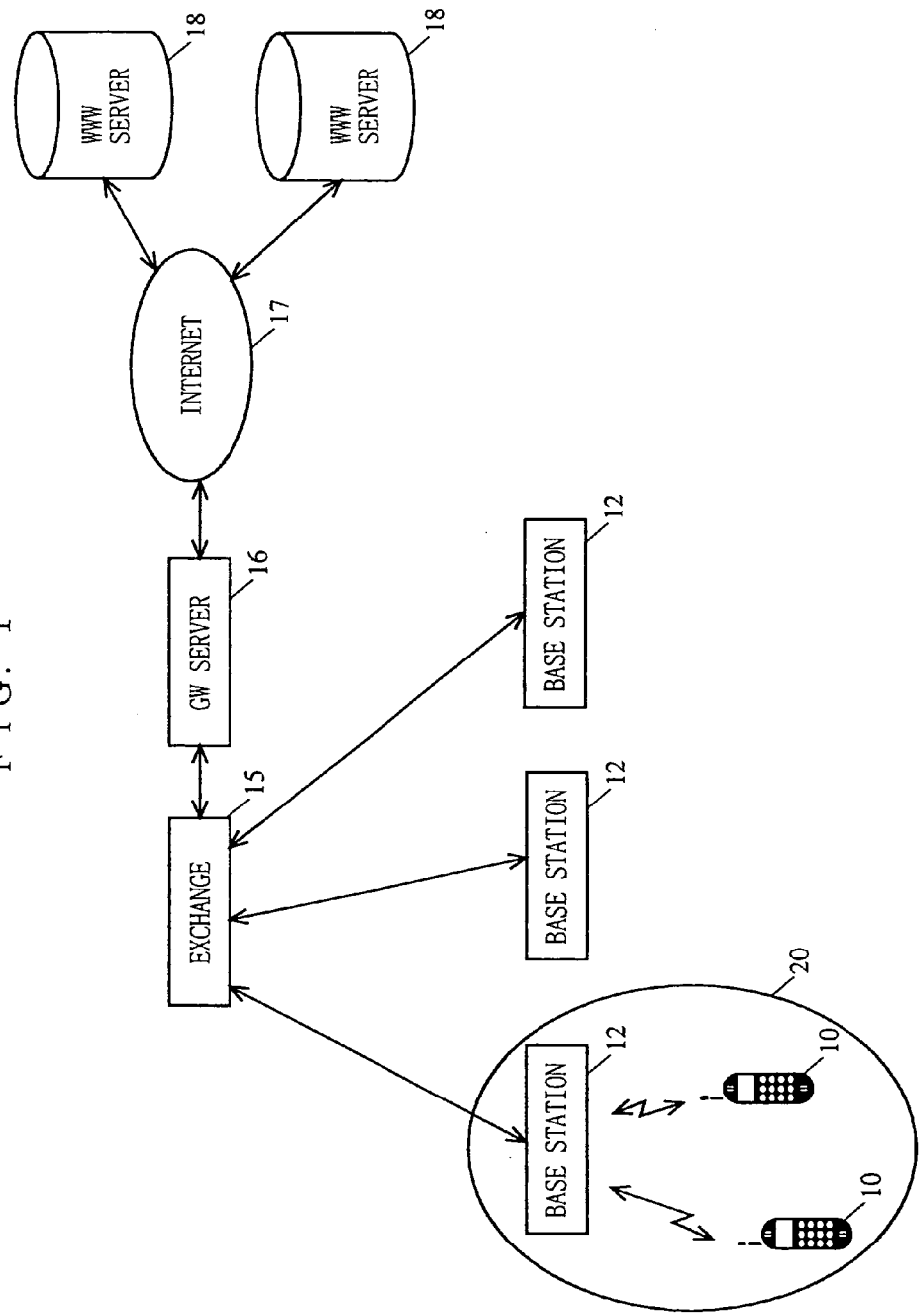
FIG. 1 is a diagram illustrating the overall configuration of a mobile communication system employing a mobile apparatus implementing a hypertext displaying apparatus according to a first embodiment of the present invention.

FIG. 1 is a diagram illustrating the overall configuration of a mobile communication system employing a mobile apparatus implementing a hypertext displaying apparatus according to a first embodiment of the present invention. In FIG. 1, the mobile communication system includes: a GW (Gateway) server 16 which is coupled to the Internet 17; a plurality of WWW (World Wide Web) servers 18 which are coupled to the Internet 17; an exchange 15 which is coupled to the GW server 16; a plurality of base stations 12 under the management of the exchange 15; and a plurality of mobile apparatuses 10 which are in a wireless zone 20 under the management of the base stations 12. It will be appreciated that the numbers of respective elements shown in FIG. 1, i.e., the WWW servers 18, the base stations 12, the mobile apparatuses 10, the GW server 16, and the exchange 15 are only exemplary and in no way restrictive.

Each WWW server 18 retains hypertext data of text information and/or images, etc., which are described in a hypertext language such as HTML. Information which is expressed in the form of hypertext data is commonly referred to as a "content". The GW server 16 mediates the data from the exchange 15 and the data from the Internet 17. The exchange 15 mediates the data from the base stations 12 and the data from the GW server 16. Each base station 12 mediates the data from the mobile apparatuses 10 and the data from the exchange 15. The communications between each mobile apparatus 10 and the base station 12 are performed via digital communications, e.g., CDMA (Code Division Multiple Access) or TDMA (Time Division Multiple Access).

In order to download desired hypertext data from the WWW servers 18, the mobile apparatuses 10 may request hypertext data to be transmitted from the WWW servers 18 via the Internet 17. Each mobile apparatus 10 displays the downloaded hypertext data on its screen.

Figure 2:
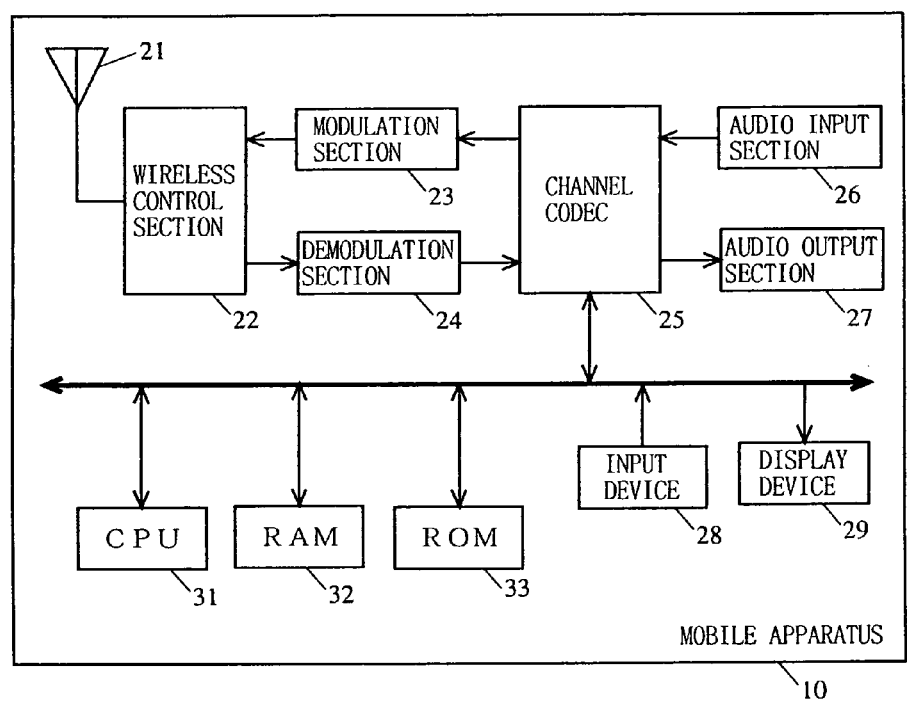
FIG. 2 is a block diagram illustrating a hardware construction of a mobile apparatus 10 shown in FIG. 1.

FIG. 2 is a block diagram illustrating a hardware construction of each mobile apparatus 10 shown in FIG. 1. In FIG. 2, the mobile apparatus 10 includes an antenna 21, a wireless control section 22, a modulation section 23, a demodulation section 24, a channel CODEC (Compression/Decompression) 25, an audio input section 26, an audio output section 27, an input device 28, a display device 29, a CPU 31, a RAM 32, and a ROM 33.

The wireless control section 22 outputs a wireless carrier wave which has been modulated by modulation data provided from the modulation section 23 via the antenna 21. The wireless control section 22 also selects a signal of a predetermined frequency band, from among high frequency signals which are received by the antenna 21, and sends the selected signal to the demodulation section 24.

The modulation section 23 subjects transmission data from the channel CODEC 25 to modulation by a predetermined method (e.g., π/4DQPSK (Differential Quadrature Phase Shift Keying) modulation), and sends the resultant data to the wireless control section 22. The demodulation section 24 demodulates a signal obtained from the wireless control section 22 and sends the demodulated signal to the channel CODEC 25. The channel CODEC 25 selectively outputs the demodulated signal from the demodulation section 24 to either the audio output section 27 or the CPU 31 as appropriate. The channel CODEC 25 also selectively outputs an audio signal which is inputted from the audio input section 26 to either the modulation section 23 or the CPU 31 as appropriate.

The audio input section 26, which can be implemented by means of a microphone or the like, sends a signal representing a sound which is inputted by a user to the channel CODEC 25. The audio output section 27, which can be implemented by means of a loudspeaker or the like, outputs a signal outputted from the channel CODEC 25 as an audible sound.

The input device 28, which can be implemented by means of a button(s) or the like used for image manipulation and for inputting dial numbers, etc., controls the operation of the CPU 31 in accordance with a user input. The display device 29, which can be implemented by means of a small-size liquid crystal display (LCD) or the like, displays display data outputted from the CPU 31 as an image on a screen.

The ROM 33 stores various programs, such as a communication controlling program for controlling the communication operations by the mobile apparatus 10; a hypertext displaying program for acquiring and displaying hypertext data from a WWW server on the Internet; a mail management program for managing e-mail; and/or an audio telephone call management program for managing voice calls. The CPU 31 is a central processing unit for executing the various program stored in the ROM 33.

The RAM 32 is a memory for providing a storage area which is necessary for the operation of the CPU 31 and for storing data which a user may wish to keep stored, e.g., stored data (described later), e-mail which has been received, mail addresses, and the like.

The mobile apparatus 10 executes the hypertext displaying program stored in the ROM 33 by means of the CPU 31. As used herein, a mobile apparatus which is executing a hypertext displaying program will be referred to as a "hypertext displaying apparatus".

Images can be displayed by the hypertext displaying apparatus in one of the following four displaying modes: a "normal display mode", a "stored data display mode", a "menu display mode", and a "stored data listing display mode".

A "normal display mode" is defined as the display mode which exists when hypertext data acquired from a WWW server 18 on the Internet is being displayed.

A "stored data display mode" is defined as the display mode which exists when stored data in the RAM 32 is being displayed. As used herein, "stored data" is defined as hypertext data which has been stored in the RAM 32 in accordance with a user instruction. Typically, hypertext data which is newly acquired from a WWW server 18 may be stored as stored data in accordance with a user instruction. The normal display mode is set as an initial display mode of a hypertext displaying apparatus which has just been activated.

A "menu display mode" is defined as the display mode which exists when an image (hereinafter referred to as a "menu image") for allowing a user to select from various functions is being displayed.

A "stored data listing display mode" is defined as the display mode which exists when an image (hereinafter referred to as a "stored data listing image") of a listing of stored data is being displayed. A stored data listing image can be selected from a menu image.

Figure 3:
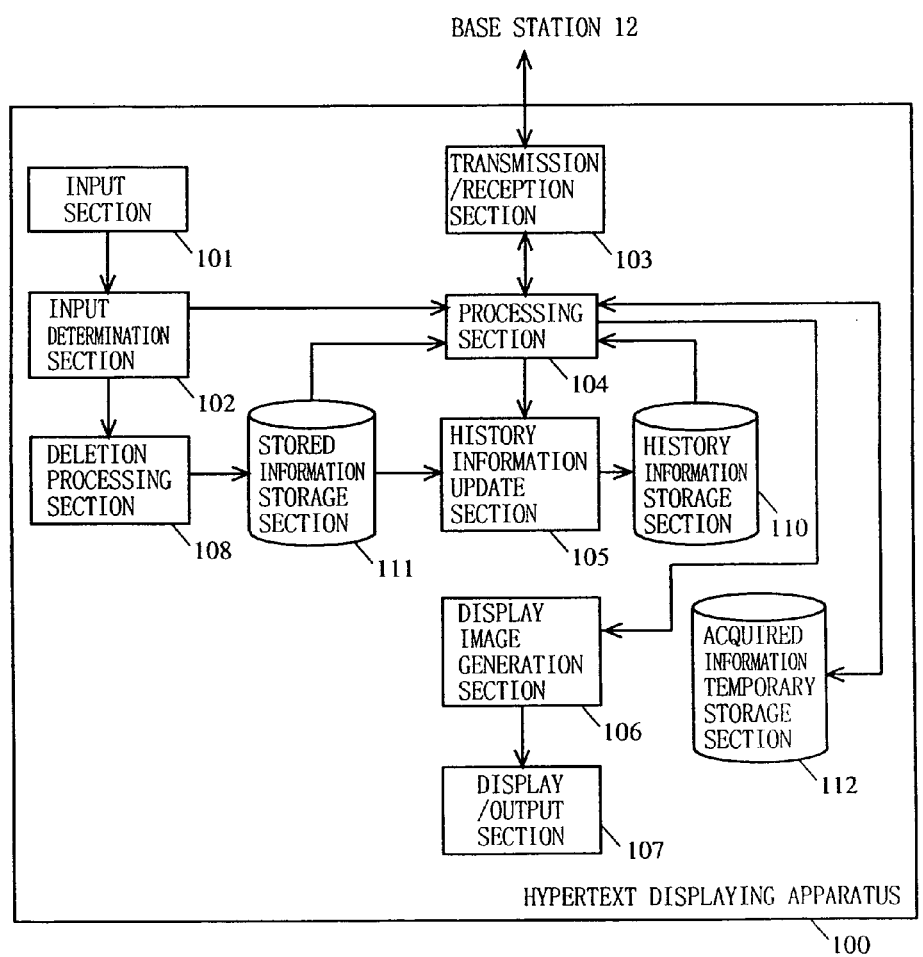
FIG. 3 is a diagram illustrating a functional construction of a hypertext displaying apparatus 100 according to the first embodiment of the present invention.

FIG. 3 is a diagram illustrating a functional construction of a hypertext displaying apparatus 100 according to the first embodiment of the present invention. In other words, FIG. 3 is a functional block diagram illustrating the mobile apparatus 10 executing the hypertext displaying program. The hypertext displaying apparatus 100 and the mobile apparatus 10, which are of the above-defined relationship with each other, will be denoted by the respective reference numerals 100 and 10 for exactness.

In FIG. 3, the hypertext displaying apparatus 100 includes an input section 101, an input determination section 102, a transmission/reception section 103, an processing section 104, a history information update section 105, a display image generation section 106, a display/output section 107, a deletion processing section 108, a history information storage section 110, a stored information storage section 111, and an acquired information temporary storage section 112.

The input section 101, which can be implemented by means of a keyboard, buttons, a joystick, a camera, a microphone, etc., corresponds to the input device 28 and the audio input section 26 shown in FIG. 2. The transmission/reception section 103 corresponds to the antenna 21, the wireless control section 22, the modulation section 23, the demodulation section 24, and the channel CODEC 25 shown in FIG. 2. The display/output section 107 corresponds to the display device 29 and the audio output section 27 shown in FIG. 2. The stored information storage section 111, the history information storage section 110, and the acquired information temporary storage section 112 are implemented as the RAM 32. The input determination section 102, the processing section 104, the history information update section 105, the display image generation section 106, and the deletion processing section 108 are implemented as the CPU 31 executing the hypertext displaying program stored in the ROM 33.

Figures 4A, 4B:
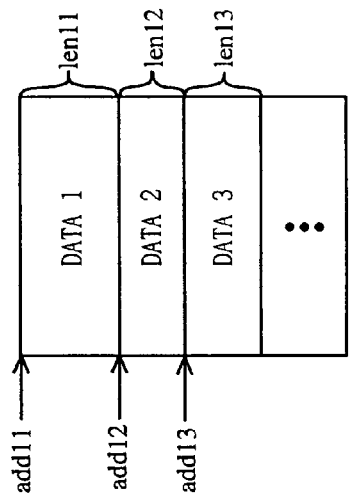
FIGS. 4A and 4B are diagrams illustrating exemplary data stored in a stored information storage section 111.

The stored information storage section 111 retains stored data, such as hypertext data which has been stored in accordance with a user instruction. There are limitations to the number of stored data, or a total maximum size thereof, which can be retained in the stored information storage section 111. No data can be stored beyond such limitations. FIGS. 4A and 4B are diagrams illustrating exemplary data stored in the stored information storage section 111. For each hypertext, the stored information storage section 111 stores a URI of an acquisition source (i.e., the source from which the hypertext is acquired), a time/date of storage, a stored area address, and a data size of the stored data, in association with an identifier (ID) assigned to that hypertext (FIG. 4A). The stored data are managed on the basis of the identifiers (ID). FIG. 4B illustrates a relationship between stored area addresses and sizes of stored data. Although the acquisition source addresses illustrated in FIG. 4A are URIs, the present invention is not limited thereto.

The history information storage section 110 stores a history of URIs or the like of any hypertext data which has been displayed in the past (i.e., newly downloaded hypertext data and stored data as necessary). FIG. 5 is a diagram illustrating exemplary data stored in the history information storage section 110. For each hypertext, the history information storage section 110 stores a last time/date of display and an identifier (ID) (which may take a NULL value as described below) in association with an acquisition source URI of that hypertext, in the order in which the respective hypertexts were displayed. The identifier (ID) (when not taking a NULL value) corresponds to an identifier (ID) of stored data retained in the stored information storage section 111. If any link destination indicated in stored data is designated by a user, then the hypertext displaying apparatus 100 registers a URI and an identifier (ID) of that stored data in the history information storage section 110, and thereafter registers a URI of the new link destination. In other words, the URI and the identifier (ID) of the stored data are stored in between those of the new link destination and those of the old link destination.

As shown in FIG. 5, a "NULL" value is given to any acquisition source URI of hypertext data which has been newly acquired from a WWW server 18 since such hypertext data has not been stored in the stored information storage section 111 and therefore does not have an identifier (ID). Note that the history information storage section 110 does not need to store a last time/date of display. The history information storage section 110 may store any other type of information, e.g., time/date of acquisition of hypertext data.

Figures 6A, 6B:
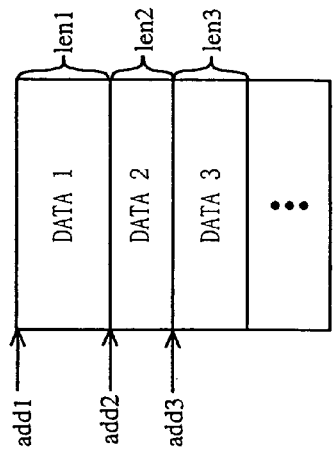
FIGS. 6A and 6B are diagrams illustrating exemplary data stored in an acquired information temporary storage section 112.

The acquired information temporary storage section 112 temporarily stores hypertext data which has been acquired from a WWW server 18. There are limitations to the number of hypertext data, or a total maximum size thereof, that can be stored. Once such limitations are exceeded, the hypertext displaying apparatus 100 deletes the oldest hypertext data (i.e., the hypertext data which has not been recently used and therefore been stored the longest in the acquired information temporary storage section 112), and instead stores new hypertext data in the acquired information temporary storage section 112. FIGS. 6A and 6B are diagrams illustrating exemplary data stored in the acquired information temporary storage section 112. For each hypertext, the acquired information temporary storage section 112 stores a time/date of creation, a stored area address, and a data size of the hypertext, in association with an acquisition source address of that hypertext data (see FIG. 6A). FIG. 6B illustrates a relationship between stored area addresses and sizes of stored data. Although the acquisition source addresses illustrated in FIG. 6A are URIs, the present invention is not limited thereto.

The input section 101 receives an instruction from a user. User instructions which may be inputted to the input section 101 can generally be classified into the following six types:

new content acquisition instructions for downloading a new content from a WWW server 18; a stored data read instruction for selecting Stored data from among the stored data on a stored data listing image and displaying the full details of the stored data; history displaying instructions for acquiring a content or reading stored data in accordance with a history of URIs stored in the history information storage section 110; a stored data deletion instruction for deleting stored data which is retained in the stored information storage section 111; a menu image displaying instruction for displaying a menu image; and a stored data listing displaying instruction for displaying a stored data listing image from a menu image.

New content acquisition instructions may include, for example, a content link destination designating instruction for designating a link destination indicated in a currently-displayed hypertext, and a stored data link destination designating instruction for designating a link destination indicated in stored data.

Under the normal display mode, history displaying instructions include a "previous content" instruction for displaying a content which is immediately previous to the currently-displayed content, and a "forward content" instruction for displaying a content which is immediately subsequent to the currently-displayed content, in accordance with a history which is stored in the history information storage section 110. Under the stored data display mode, history displaying instructions include a "previous stored data" instruction for displaying stored data which is immediately previous to the currently-displayed stored data, and a "forward stored data" instruction for displaying stored data which is immediately subsequent to the currently-displayed stored data, in accordance with an order of stored data which is stored in the stored information storage section 111.

The input section 101 passes a user instruction to the input determination section 102. A user may input a new content acquisition instruction in a variety of manners which include, e.g., designating a link destination by utilizing a bookmark function, directly inputting a URI, or designating a link destination which is recalled from another application, such as a directory application. As used herein, the expressions "previous" and "forward" mean "go back to immediately previous data" and "go forward to immediately subsequent data", respectively. Any alternative expressions may be used instead, e.g., "back" and "next". Moreover, the "previous" instructions and "forward" instructions may be inputted by employing additional buttons dedicated to such purposes, or via any other input operations.

The input determination section 102 determines the user instruction which is inputted via the input section 101. If the user instruction is a new content acquisition instruction, a stored data read instruction, a history displaying instruction, a menu image displaying instruction, or a stored data listing displaying instruction, then the instruction is passed on to the processing section 104. If the user instruction is a stored data deletion instruction, the input determination section 102 requests the deletion processing section 108 to delete stored data as instructed.

In accordance with a request from the processing section 104, the transmission/reception section 103 acquires hypertext data representing a new content which has been requested by the user via a base station 12 from a WWW server 18, and sends the hypertext data to the processing section 104.

The processing section 104 has a function of storing a current display mode (not shown). As described earlier, the default display mode which exists when the hypertext displaying program is turned on is the normal display mode. If a new content acquisition instruction is received from the input determination section 102 under the normal display mode, the processing section 104 requests the transmission/reception section 103 to download hypertext data representing a new content from a WWW server 18. The processing section 104 sends the hypertext data downloaded by the transmission/reception section 103 to the display image generation section 106, and sends a URI of the new content to the history information update section 105. On the other hand, if the new content acquisition instruction is received under the stored data display mode, the processing section 104 sends the downloaded hypertext data from the transmission/reception section 103 to the display image generation section 106, sends a URI and an identifier (ID) of currently-displayed stored data as well as the URI of the new content to the history information update section 105, and switches the display mode from the stored data display mode to the normal display mode.

If a stored data read instruction is received from the input determination section 102, the processing section 104 reads relevant stored data from the stored information storage section 111, and sends the read stored data to the display image generation section 106. The processing section 104 also has a function of storing a URI and an identifier (ID) of a currently-displayed stored data (not shown). As such, when sending stored data to the display image generation section 106, the processing section 104 stores a URI and an identifier (ID) of the stored data. If the stored data read instruction is received under the normal display mode, the processing section 104 switches the display mode from the normal display mode to the stored data display mode.

If a history displaying instruction, in particular a "previous content" instruction is received, the processing section 104 obtains from the history information storage section 110 an acquisition source URI which lies immediately previous to the URI of the currently-displayed content. If an identifier (ID) is assigned to the obtained URI, the processing section 104 reads the stored data corresponding to that identifier (ID) from the stored information storage section 111, and sends the stored data to the display image generation section 106 with an instruction to display the stored data. However, if the necessary hypertext data is not found in the stored information storage section 111, the processing section 104 instructs the transmission/reception section 103 to download the necessary hypertext data based on the URI of the lost stored data.

On the other hand, if no identifier (ID) is assigned to the obtained URI, the processing section 104 instructs the transmission/reception section 103 to download the hypertext data corresponding to that URI, and sends the hypertext data to the display image generation section 106 with an instruction to display the hypertext data. The foregoing operation applies mutatis mutandis to a "forward content" instruction. Thus, the processing section 104 functions to control the order in which contents are redisplayed.

If a history displaying instruction, in particular a "previous stored data" or a "forward stored data" instruction is received, the processing section 104 retrieves from the stored information storage section 111 immediately previous stored data or immediately subsequent stored data, respectively, in accordance with the order in which the stored data are stored, and sends the retrieved stored data to the display image generation section 106, with an instruction to display the stored data. In this case, too, the processing section 104 stores a URI and an identifier (ID) of the stored data, as mentioned above.

If a menu image displaying instruction is received, the processing section 104 instructs the display image generation section 106 to display a menu image. If a stored data listing displaying instruction is received, the processing section 104 requests the stored information storage section 111 for a stored data listing, and instructs the display image generation section 106 to display the stored data listing.

Upon receiving a URI with or without an identifier (ID) from the processing section 104, the history information update section 105 updates the history information stored in the history information storage section 110. Specifically, in the case where an identifier (ID) is sent together with a URI from the processing section 104 (i.e., the display image generation section 106 is to display stored data), the history information update section 105 treats the URI as an acquisition source URI, and stores the URI together with the associated identifier (ID) in the history information storage section 110 in the order of display. On the other hand, if no identifier (ID) is sent with a URI from the processing section 104, the URI is stored as an acquisition source URI in the history information storage section 110 in the order of display. When storing an acquisition source URI in the history information storage section 110, the history information update section 105 also stores a last time/date of display of that content.

Upon receiving an instruction to generate a display image from the processing section 104, the display image generation section 106 generates a display data based on the hypertext data which has been sent from the processing section 104, and sends the generated display data to the display/output section 107. The display/output section 107, which includes a display device, a loudspeaker, and the like, displays and/or outputs the display data received from the display image generation section 106 in the form of an image and/or a sound, etc.

The deletion processing section 108, upon receiving a stored data deletion instruction from the input determination section 102, deletes the stored data in the stored information storage section 111 that has been requested to be deleted.

FIG. 7 is a diagram illustrating a transition of exemplary images displayed by the hypertext displaying apparatus 100. Hereinafter, how the display images may change in accordance with user inputs will be described with reference to FIG. 7. Image (a) of FIG. 7 illustrates a content named "INDEX" being displayed on the screen. If the user designates a link destination "weather" indicated in the "INDEX" content, then the hypertext displaying apparatus 100 downloads hypertext data at the link destination "weather" and may display a content named "Weather of your city" (see (b) of FIG. 7).

If the user further designates a link destination "Hokkaido" indicated in the "Weather of your city" content, then the hypertext displaying apparatus 100 downloads the hypertext data at the link destination "Hokkaido", and may display a content named "Hokkaido weather" (see (c) of FIG. 7). Note that such selections of link destinations, which are made in the display images by a user, each correspond to the above-described new content acquisition instruction. Images (a) to (c) of FIG. 7 illustrate contents which are displayed in the normal display mode.

If the user gives a "previous" instruction or a "forward" instruction while any of the contents shown in (a) to (c) of FIG. 7 is being displayed, then the hypertext displaying apparatus 100 displays an immediately previous content or an immediately subsequent content of a currently-displayed content, respectively, in accordance with a history of displayed images stored in the history information storage section 110. If the user gives a menu image displaying instruction while the content shown in (c) of FIG. 7, then the hypertext displaying apparatus 100 displays a menu image as shown in (d) of FIG. 7. If the user further gives a stored data listing displaying instruction at this point, then the hypertext displaying apparatus 100 displays a stored data listing image (see (e) of FIG. 7).

If the user wishes to view the details of any of the stored data listed in the stored data listing image shown in (e) of FIG. 7, the user may select the desired stored data. Image (e) of FIG. 7 illustrates the case where "Movie information" is selected as the desired stored data. Note that this selection corresponds to the above-described stored data read instruction. In response to the stored data read instruction given by the user, the hypertext displaying apparatus 100 displays the details of the stored data (see (g) of FIG. 7). Thus, when any stored data is selected from a stored data listing image, an image will be displayed in the stored data display mode.

If a "previous stored data" instruction or a "forward stored data" instruction is given while the stored data shown in (g) of FIG. 7 is being displayed, then the hypertext displaying apparatus 100 displays immediately previous stored data or immediately subsequent stored data, respectively, in accordance with the order of stored data retained in the stored information storage section 111 (see (f) to (h) of FIG. 7). As used herein, the "order of stored data" refers to the order of titles of stored data which are indicated in a stored data listing image.

If the user wishes to access a link destination indicated in a display image of stored data shown in (h) of FIG. 7, the user may select that link destination. Image (h) of FIG. 7 illustrates the case where a link destination "Cantonese cuisine" is selected. In response to this selection, the hypertext displaying apparatus 100 downloads and displays hypertext data at this link destination (see (j) of FIG. 7). Note that an instruction for accessing a link destination indicated in any stored data is a new content acquisition instruction. Once the link destination indicated in the stored data is displayed, the display mode is switched from the stored data display mode to the normal display mode.

If the user gives a "previous" instruction while the content shown in (j) of FIG. 7 is being displayed, the hypertext displaying apparatus 100 accesses the history information storage section 110 in order to display the most recently displayed stored data (see (i) of FIG. 7). Note that image (i) of FIG. 7, although identical to the stored data shown in (h) of FIG. 7, is displayed under the normal display mode. The user can easily redisplay any of the display images of (a) to (c), (i), and (j) of FIG. 7 with "previous content" or "forward content" instructions.

What is characteristic about the operation of the hypertext displaying apparatus 100 according to the first embodiment of the present invention is the operation when a new content acquisition instruction or a history displaying instruction is received. The operation when a stored data read instruction, a stored data deletion instruction, a menu image displaying instruction, or a stored data listing displaying instruction is received is not essential to the central concept of the present invention, and therefore further detailed descriptions thereof are omitted. Hereinafter, the operation of the hypertext displaying apparatus 100 when a new content acquisition instruction or a history displaying instruction is received will be described.

FIG. 8 is a flowchart illustrating the operation of the hypertext displaying apparatus 100 when receiving a new content acquisition instruction. Hereinafter, with reference to FIG. 8, the operation of the hypertext displaying apparatus 100 when receiving a new content acquisition instruction new content acquisition instruction will be described.

First, a new content acquisition instruction given by a user is supplied to the processing section 104 via the input section 101 and the input determination section 102. Having received the new content acquisition instruction, the processing section 104 instructs the transmission/reception section 103 to download hypertext data representing the designated new content based on a URI, whereby the hypertext data is acquired (step S10). Next, the processing section 104 stores the newly-acquired hypertext data in the acquired information temporary storage section 112 (step S11), and sends the hypertext data to the display image generation section 106 with an instruction to generate display data based on the hypertext data. Next, the processing section 104 determines whether the current display mode is the normal display mode or the stored data display mode (step S12). The processing section 104 is capable of determining the current display mode on the basis of its function of storing a current display mode (not shown).

If the current display mode is the normal display mode, then the processing section 104 proceeds to the operation of step S16. On the other hand, if the current display mode is the stored data display mode, then the processing section 104 proceeds to the operation of step S13 to obtain a URI and an identifier (ID) of the currently-displayed stored data (step S13). The determination of step S12 is possible because a URI and an identifier (ID) of the stored data are retained by the processing section 104.

Next, the processing section 104 instructs the history information update section 105 to register the obtained identifier (ID) and URI in the history information storage section 110 (step S14). Then, the processing section 104 switches the current Display mode, which is retained in the processing section 104 itself, from the stored data display mode to the normal display mode (step S15), and proceeds to the operation of step S16.

At step S16, the processing section 104 instructs the history information update section 105 to register the URI of the hypertext data which was newly acquired in the operation of step S10 in the history information storage section 110. Upon receiving this instruction, the history information update section 105 registers the URI and the last time/date of display of the new hypertext data in the history information storage section 110. Since the new hypertext data is not stored data, no identifier (ID) is assigned for this URI in the history information storage section 110.

Next, the display image generation section 106 generates display data (step S17), and causes the display/output section 107 to display and/or output the content represented by the hypertext data (step S18), thereby ending the processing.

Figure 9:
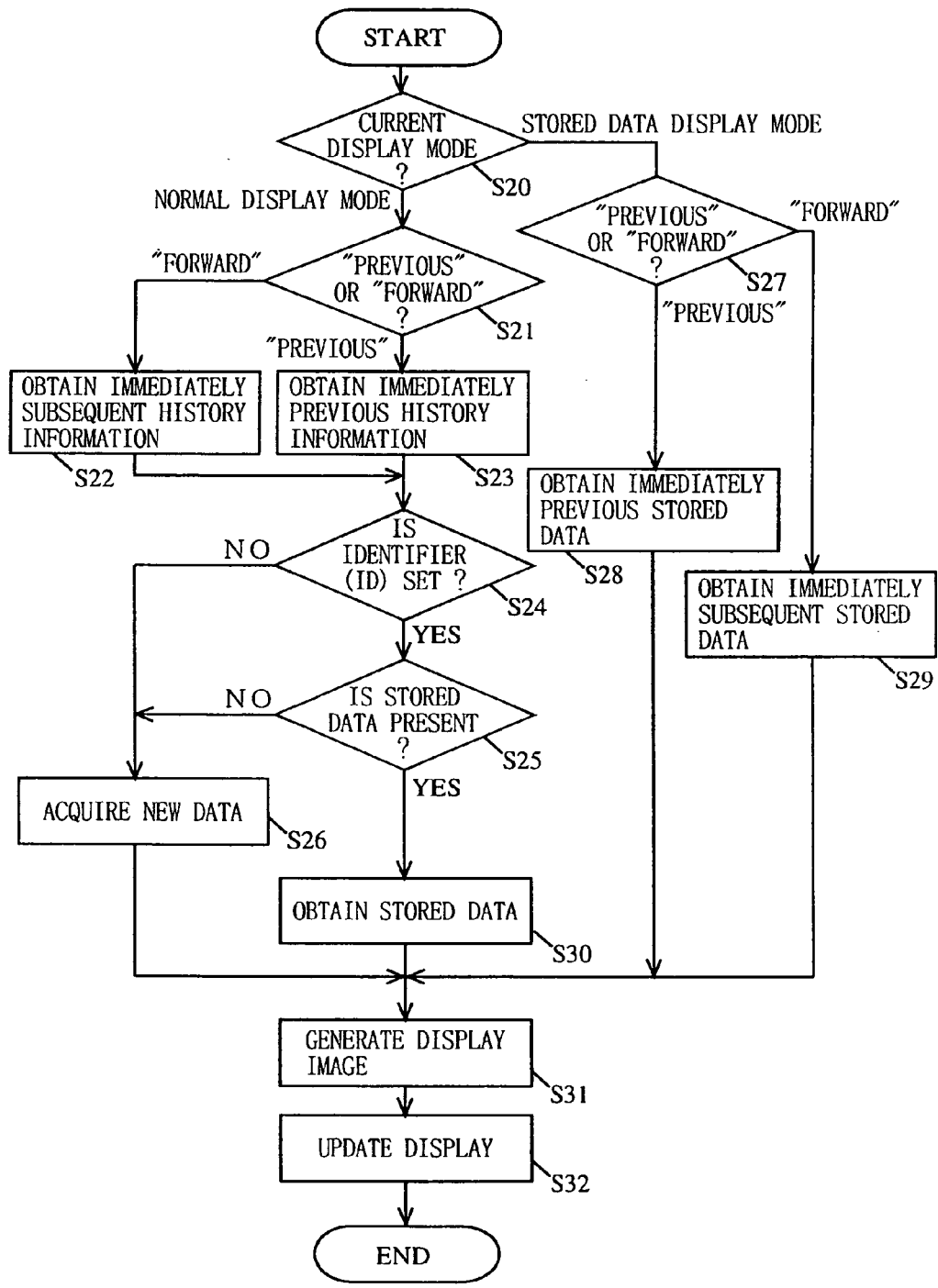
FIG. 9 is a flowchart illustrating an operation of the hypertext displaying apparatus 100 when receiving a history displaying instruction.

FIG. 9 is a flowchart illustrating an operation of the hypertext displaying apparatus 100 when receiving a history displaying instruction. Hereinafter, with reference to FIG. 9, the operation of the hypertext displaying apparatus when a history displaying instruction is received will be described.

First, a history displaying instruction given by a user is supplied to the processing section 104 via the input section 101 and the input determination section 102. Having received the history displaying instruction, the processing section 104 determines whether the current display mode is the stored data display mode or the normal display mode (step S20). If the current display mode is the stored data display mode, the processing section 104 proceeds to the operation of step S27 to determine whether the history displaying instruction given by the user is a "previous stored data" instruction or a "forward stored data" instruction (step S27).

If the instruction given by the user is determined to be a "previous stored data" instruction, the processing section 104 accesses the stored information storage section 111 to obtain stored data which lies immediately previous to the currently-displayed stored data in accordance with the stored data listing (step S28), and sends the stored data to the display image generation section 106 with an instruction to generate display data based on the stored data. Thereafter, the hypertext displaying apparatus 100 proceeds to the operation of step S31. On the other hand, if the instruction given by the user is a "forward stored data" instruction, the processing section 104 accesses the stored information storage section 111 to obtain stored data which lies immediately subsequent to the currently-displayed stored data in accordance with the stored data listing (step S29), and sends the stored data to the display image generation section 106 with an instruction to generate display data based on the stored data. Thereafter, the hypertext displaying apparatus 100 proceeds to the operation of step S31.

On the other hand, if the current display mode is determined to be the normal display mode in the operation of step S20, the processing section 104 proceeds to the operation of step S21 to determine whether the history displaying instruction given by the user is a "previous content" instruction or a "forward content" instruction (step S21). If the instruction given by the user is a "previous content" instruction, the processing section 104 accesses the history information storage section 110 to obtain a piece of history information (i.e., an acquisition source URI with or without an identifier (ID)) which lies immediately previous to the currently-displayed hypertext data (step S23), and proceeds to the operation of step S24. On the other hand, if the instruction given by the user is a "forward content" instruction, the processing section 104 accesses the history information storage section 110 to obtain a piece of history information (i.e., an acquisition source URI with or without an identifier (ID)) which lies immediately subsequent to the currently-displayed hypertext data (step S22), and proceeds to the operation of step S24.

At step S24, the processing section 104 determines whether there is an identifier (ID) set in the history information obtained from the history information storage section 110. Specifically, if the identifier (ID) has a "NULL" value (see FIG. 5), the processing section 104 determines that no identifier (ID) is set.

If it is determined in the operation of step S24 that no identifier (ID) is set, then the processing section 104 proceeds to the operation of step S26. On the other hand, if it is determined that an identifier (ID) is set in the history information, then the processing section 104 proceeds to the operation of step S25 to determine whether or not any stored data which matches the identifier (ID) and the acquisition source URI is present in the stored information storage section 111 (step S25). The reason why matching of both the identifier (ID) and the acquisition source URI is checked is that, for example, the user may have requested the stored data in the stored information storage section 111 to be deleted, or the data may have been overwritten by other data, so that the same identification information may point to different stored data.

If it is determined at step S25 that there is matching stored data in the stored information storage section 111, the processing section 104 retrieves the matching stored data from the stored information storage section 111, and sends the matching stored data to the display image generation section 106 with an instruction to generate display data based thereupon (step S30). Thereafter, the hypertext displaying apparatus 100 proceeds to the operation of step S31. On the other hand, if it is determined that no matching stored data is in the stored information storage section 111, the processing section 104 proceeds to the operation of step S26.

At step S26, the processing section 104 instructs the transmission/reception section 103 to newly download the necessary hypertext data based on the acquisition source URI in the history information (step S26), and sends the downloaded hypertext data to the display image generation section 106 with an instruction to generate display data based thereupon. Thereafter, the hypertext displaying apparatus 100 proceeds to the operation of step S31.

At step S31, the display image generation section 106 generates display data based on the request from the processing section 104 (step S31), and causes the display/output section 107 to display and/or output the content represented by the hypertext data (step S32), thereby ending the processing.

Thus, in accordance with the hypertext displaying apparatus 100 of the first embodiment, when a link destination indicated in currently-displayed stored data is designated by a user under the stored data display mode, a URI and an identifier (ID) of the stored data in which the link destination is indicated (i.e., the "source content") are registered in the history information storage section 110. As a result, when a history displaying instruction such as a "previous content" or "forward content" instruction, etc., is given, it is possible to locate the stored area of the originally-displayed stored data (i.e., the "source content") by checking the identifier (ID) thereof, thereby allowing the originally-displayed stored data to be redisplayed. Thus, a hypertext displaying apparatus can be provided which, after a user designates a link destination indicated in stored data in order to acquire and display new data at the link destination from a server device, still allows the originally-displayed stored data to be easily redisplayed.

No stored data may be found that matches the stored data to be displayed in response to a manipulation based on the history information (e.g., a "previous content" or "forward content" instruction: hereinafter collectively referred to as "history manipulations") because the data may have been deleted in response to a user instruction, etc. In such a situation, however, the hypertext displaying apparatus 100 again downloads hypertext data at the acquisition source URI from a server device, which will presumably be identical or similar to the stored data which would have been redisplayed. Thus, the originally-displayed stored data can be redisplayed with practical certainty.

The first embodiment illustrates an example where the processing section 104 sends hypertext data to the display image generation section 106, which is instructed to generate display data based on the hypertext data. Alternatively, the processing section 104 may only send information which helps identifying hypertext data (e.g., an URI and an identifier (ID)) to the display image generation section 106, and the display image generation section 106 may directly obtain the necessary hypertext data from the stored information storage section 111 or the acquired information temporary storage section 112 in order to generate display data based thereupon.

Alternatively, the hypertext displaying apparatus may be arranged so that the processing section 104 sends hypertext data to the display image generation section 106 via the history information update section 105.

The first embodiment illustrates an example where hypertext data is newly downloaded from a WWW server 18 (steps S24, S26 in FIG. 9) in the case where the data to be displayed in response to a history manipulation is not stored data. Alternatively, the hypertext displaying apparatus may be arranged so that, without accessing a WWW server 18, the processing section 104 retrieves data which is stored in the acquired information temporary storage section 112 and instructs the display image generation section 106 to redisplay the retrieved data in such cases.

Although the first embodiment illustrates an example where a mobile apparatus is employed as a computer device which executes the hypertext displaying program described above, the present invention is not limited to embodiments employing a mobile apparatus. Any communication device may alternatively be employed, e.g., a personal computer.

Second Embodiment

Figure 10:
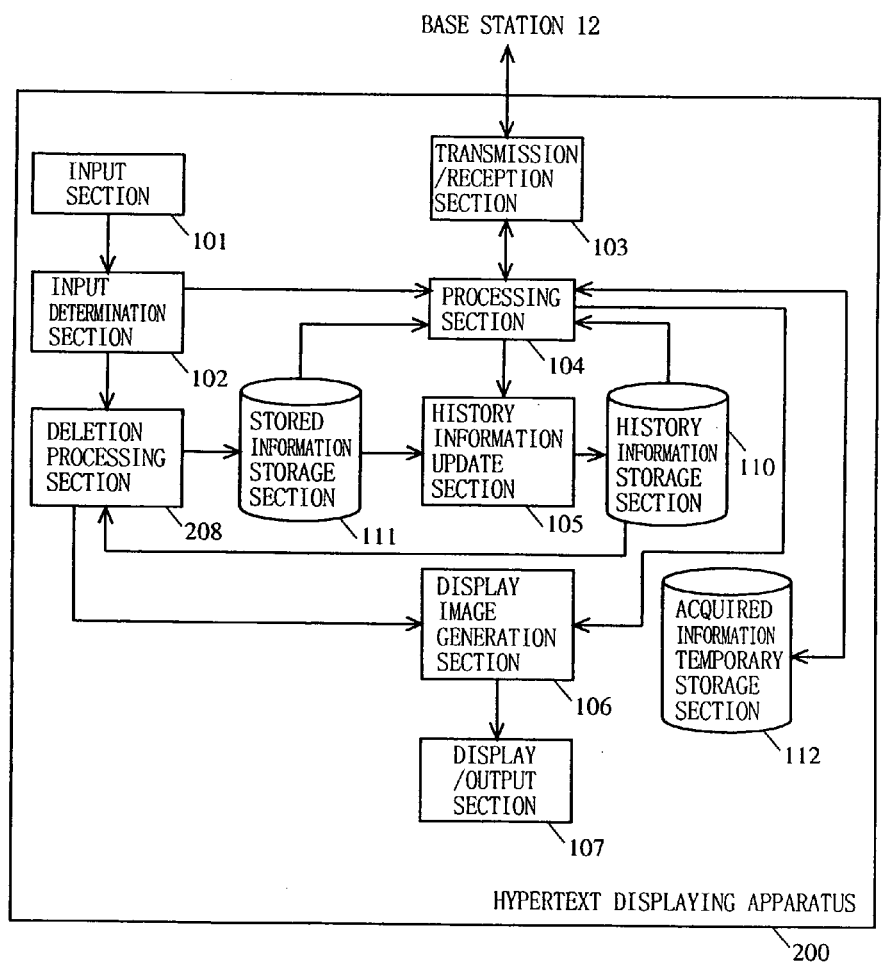
FIG. 10 is a diagram illustrating a functional construction of a hypertext displaying apparatus 200 according to a second embodiment of the present invention.

Hereinafter, a hypertext displaying apparatus according to a second embodiment of the present invention will be described. See FIG. 1 and FIG. 2, respectively, for the overall structure of a mobile communication system employing a mobile apparatus implementing the hypertext displaying apparatus according to the second embodiment and the hardware structure of the mobile apparatus itself, which are similar to those described in the first embodiment. FIG. 10 is a functional block diagram illustrating the hypertext displaying apparatus 200 according to the second embodiment of the present invention. In FIG. 10, any elements having similar functions to their counterparts of the hypertext displaying apparatus 100 according to the first embodiment will be denoted by like reference numerals, and the descriptions thereof will be omitted. In FIG. 10, the hypertext displaying apparatus 200 includes a deletion processing section 208, as distinct from the deletion processing section 108 shown in FIG. 3.

When a stored data deletion instruction is made via the input determination section 102, the deletion processing section 208 accesses the history information storage section 110 to determine whether or not the stored data to be deleted is registered in the history information storage section 110. The deletion processing section 208 deletes the stored data to be deleted, from the stored information storage section 111, only if the stored data to be deleted is not registered in the history information storage section 110. The deletion processing section 208 instructs the display image generation section 106 to display a message concerning a deletion process to be performed for the stored data.

Figure 11:
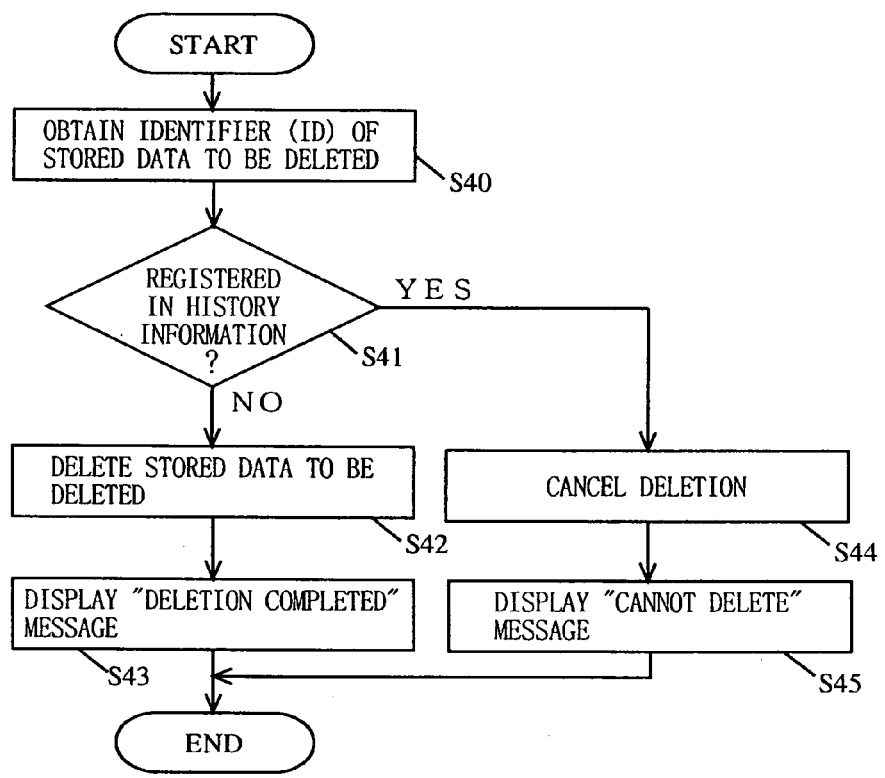
FIG. 11 is a flowchart illustrating an operation of the hypertext displaying apparatus 200 when receiving a stored data deletion instruction.

FIG. 11 is a flowchart illustrating an operation of the hypertext displaying apparatus 200 when receiving a stored data deletion instruction. Hereinafter, with reference to FIG. 11, the operation of the hypertext displaying apparatus 200 when receiving a stored data deletion instruction will be described.

First, as a user instruction is given for deleting given stored data, the deletion processing section 208 obtains from the stored information storage section 111 an identifier (ID) of the stored data to be deleted (step S40). Next, the deletion processing section 208 accesses the history information storage section 110 to determine whether or not any stored data corresponding to the obtained identifier (ID) is registered in the form of history information (step S41).

If the stored data to be deleted is not found to be registered in the history information storage section 110, the deletion processing section 208 deletes from the stored information storage section 111 the stored data to be deleted (step S42), and instructs the display image generation section 106 to display a message that the deletion process has been completed. Upon receiving this instruction, the display image generation section 106 causes the display/output section 107 to display the message that the deletion process has been completed (step S43), thereby ending the processing.

On the other hand, if the stored data to be deleted is found to be registered in the history information storage section 110, the deletion processing section 208 cancels the deletion process (step S44), and instructs the display image generation section 106 to display a message that the stored data which has been requested to be deleted cannot be deleted. Upon receiving this instruction, the display image generation section 106 causes the display/output section 107 to display the message that the stored data which has been requested to be deleted cannot be deleted (step S45), thereby ending the processing.

Thus, before deletion of any stored data, the hypertext displaying apparatus 200 according to the second embodiment determines whether or not the stored data is registered in the form of history information, thereby deciding whether or not to actually delete the stored data as requested. As a result, the hypertext displaying apparatus is capable of forestalling a situation where, when a history manipulation (e.g., with a "previous content" or "forward content" instruction) is given under the normal display mode, no hypertext data is found available for display because the stored data of interest has been deleted although still registered in the history information.

Although the second embodiment illustrates an example where a message is displayed on the screen to indicate completion of a deletion process screen, the present invention is not limited thereto. Alternatively, a successful deletion or a deletion failure may be notified by using a sound.

Third Embodiment

Figure 12:
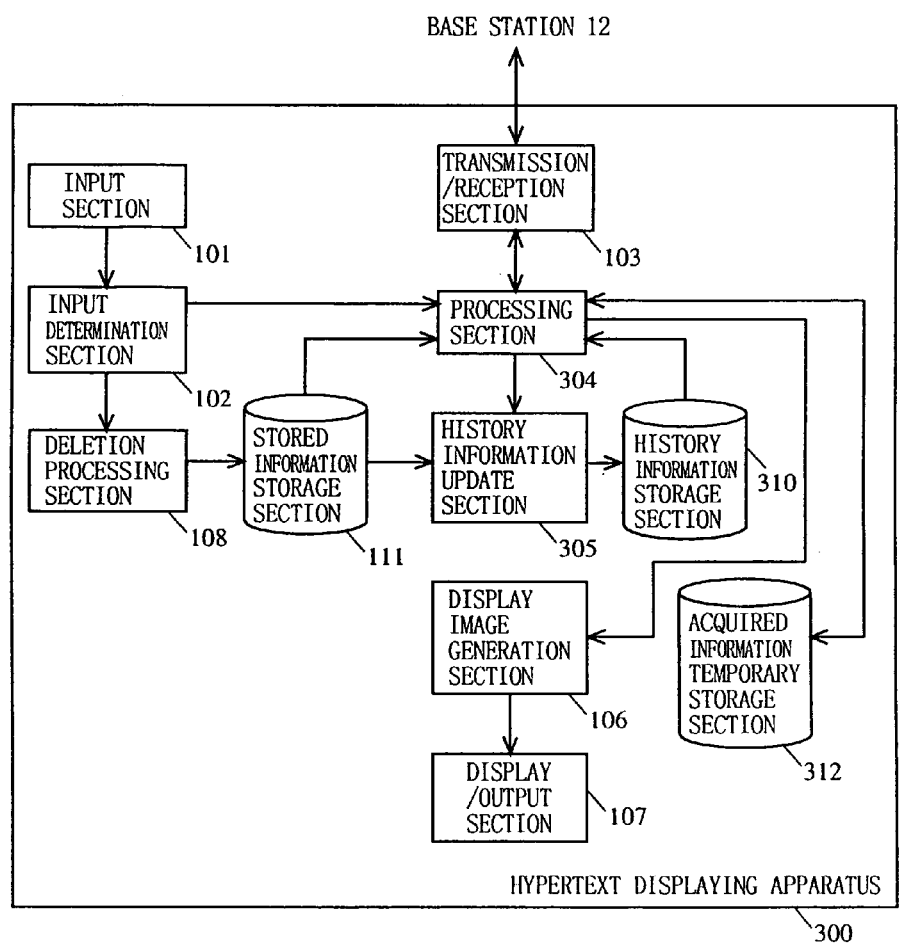
FIG. 12 is a diagram illustrating a functional construction of a hypertext displaying apparatus 300 according to a third embodiment of the present invention.

Hereinafter, a hypertext displaying apparatus according to a third embodiment of the present invention will be described. See FIG. 1 and FIG. 2, respectively, for the overall structure of a mobile communication system employing a mobile apparatus implementing the hypertext displaying apparatus according to the third embodiment and the hardware structure of the mobile apparatus itself, which are similar to those described in the first embodiment. FIG. 12 is a functional block diagram illustrating the hypertext displaying apparatus 300 according to the third embodiment of the present invention. In FIG. 12, any elements having similar functions to their counterparts of the hypertext displaying apparatus 100 according to the first embodiment will be denoted by like reference numerals, and the descriptions thereof will be omitted. In FIG. 12, the hypertext displaying apparatus 300 includes a processing section 304, a history information update section 305, a history information storage section 310, and an acquired information temporary storage section 312, as distinct from, the processing section 104, the history information update section 105, the history information storage section 110, and the acquired information temporary storage section 112 shown in FIG. 3, respectively.

Figure 13:
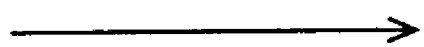
FIG. 13 is a diagram illustrating exemplary data stored in a history information storage section 310.

The history information storage section 310 stores a history of URIs, etc., of hypertext data which have been displayed in the past (including newly-downloaded hypertext data and stored data designated by the processing section 304). FIG. 13 is a diagram illustrating exemplary data stored in the history information storage section 310. The history information storage section 310 stores a last time/date of display in association with the acquisition source URI of each hypertext. Unlike the history information storage section 110 according to the first embodiment, the history information storage section 310 does not store any identifiers (ID) in association with a history of stored data.

Figures 14A, 14B:
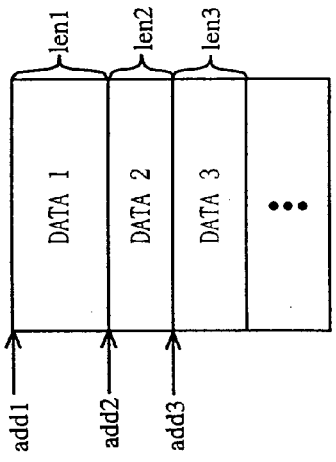
FIGS. 14A and 14B are diagrams illustrating exemplary data stored in the acquired information temporary storage section 312.

The acquired information temporary storage section 312 temporarily stores hypertext data which has been acquired from a WWW server 18. There are similar limitations to the number of hypertext data that can be stored, etc., as is the case with the acquired information temporary storage section 112 according to the first embodiment. FIGS. 14A and 14B are diagrams illustrating exemplary data stored in the acquired information temporary storage section 312. The acquired information temporary storage section 312 stores, in association with a URI of an acquisition source from which hypertext data is acquired, a time/date of creation, a stored area address, a data size of the hypertext, and an identifier (ID) (see FIG. 14A). FIG. 14B illustrates a relationship between stored area addresses and sizes of stored data. For each acquisition source URI associated with stored data, an identifier (ID) which is set in the stored information storage section 111 is registered as an identifier (ID) in the acquired information temporary storage section 312. For each acquisition source URI which is not associated with stored data, no identifier (ID) is registered in the acquired information temporary storage section 312, as expressed by the "NULL" value in FIG. 14A.

As in the first embodiment, the processing section 304 includes a function (not shown) which stores a current display mode and a function (not shown) which stores a URI and an identifier (ID) of any stored data which has been sent to the display image generation section 106. If a new content acquisition instruction is received under the normal display mode, the processing section 304 instructs the transmission/reception section 103 to download new hypertext data, sends the downloaded new hypertext data to the display image generation section 106, and sends a URI of the new content to the history information update section 305. In this case, the processing section 304 stores the new hypertext data in the acquired information temporary storage section 312.

If a new content acquisition instruction is received under the stored data display mode, the processing section 304 instructs the transmission/reception section 103 to download new hypertext data, sends the downloaded new hypertext data to the display image generation section 106, and sends a URI of the new content and a URI of the stored data which has hitherto been displayed to the history information update section 305. In this case, the processing section 304 sends the URI and an identifier (ID) of the hitherto-displayed stored data to the acquired information temporary storage section 312.

If a history displaying instruction, in particular a "previous content" instruction is received, the processing section 304 obtains from the history information storage section 310 an acquisition source URI which lies immediately previous to the URI of the currently-displayed content, and determines whether or not an identifier (ID) is set in association with that URI in the acquired information temporary storage section 312. If such an identifier (ID) is set, the processing section 304 retrieves hypertext data corresponding to the URI from the stored information storage section 111, and sends the retrieved hypertext data to the display image generation section 106. On the other hand, if no such identifier (ID) is set, the processing section 304 retrieves hypertext data corresponding to the URI from the acquired information temporary storage section 312, and sends the retrieved hypertext data to the display image generation section 106. The foregoing operation applies mutatis mutandis to a "forward content" instruction. Alternatively, if no such identifier (ID) is set, the processing section 304 may instruct the transmission/reception section 103 to newly download the hypertext data, rather than retrieve the hypertext data from the acquired information temporary storage section 312.

The operation of the processing section 304 when receiving a history displaying instruction, in particular a "previous stored data" or "forward stored data" instruction, is similar to that of the processing section 104 according to the first embodiment, and the description thereof is omitted. Likewise, the operation of the processing section 304 when receiving a stored data read instruction, a menu image displaying instruction, or a stored data listing displaying instruction is similar to that of the processing section 104 according to the first embodiment, and the description thereof is omitted.

Upon receiving a URI from the processing section 304, the history information update section 305 registers the URI in the history information storage section 310.

Hereinafter, the operation of the hypertext displaying apparatus 300 when receiving a new content acquisition instruction or a history displaying instruction will be described.

Figure 15:
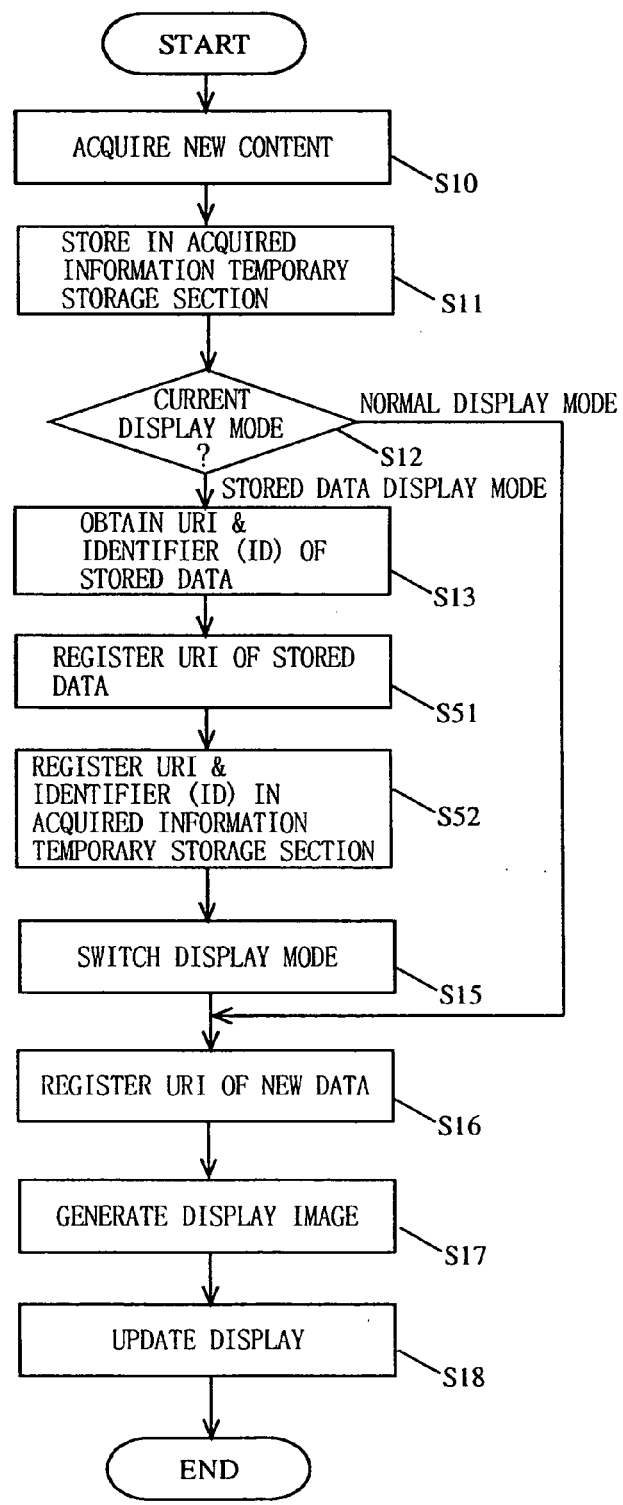
FIG. 15 is a flowchart illustrating an operation of the hypertext displaying apparatus 300 when receiving a new content acquisition instruction.

FIG. 15 is a flowchart illustrating an operation of the hypertext displaying apparatus 300 when receiving a new content acquisition instruction. In FIG. 15, any steps which are performed in a similar manner by the hypertext displaying apparatus 100 of the first embodiment will be denoted by the same step numbers as those used in FIG. 8 in order to simplify the descriptions thereof. Hereinafter, with reference to FIG. 15, the operation of the hypertext displaying apparatus 300 when receiving a new content acquisition instruction will be described.

First, in accordance with a user instruction, the processing section 304 instructs the transmission/reception section 103 to download hypertext data representing a new content (step S10), stores the downloaded hypertext data in the acquired information temporary storage section 312 (step S11), and determines whether the current display mode is the normal display mode or the stored data display mode (step S12).

If the current display mode is determined to be the normal display mode, the processing section 304 proceeds to the operation of step S16. On the other hand, if the current display mode is determined to be the stored data display mode, the processing section 304 obtains a URI and an identifier (ID) of the currently-displayed stored data (step S13). Next, the obtained URI is registered in the latest area in the history information storage section 310 (step S51). Then, the processing section 304 registers the URI and the identifier (ID) of the stored data in the acquired information temporary storage section 312 (step S52). Thereafter, the processing section 304 switches the display mode (step S15), and proceeds to the operation of step S16.

In the operation of step 16 and the subsequent steps, the hypertext displaying apparatus 300 displays the newly-acquired hypertext data on the screen (steps S17 to S18), thereby ending the operation.

Figure 16:
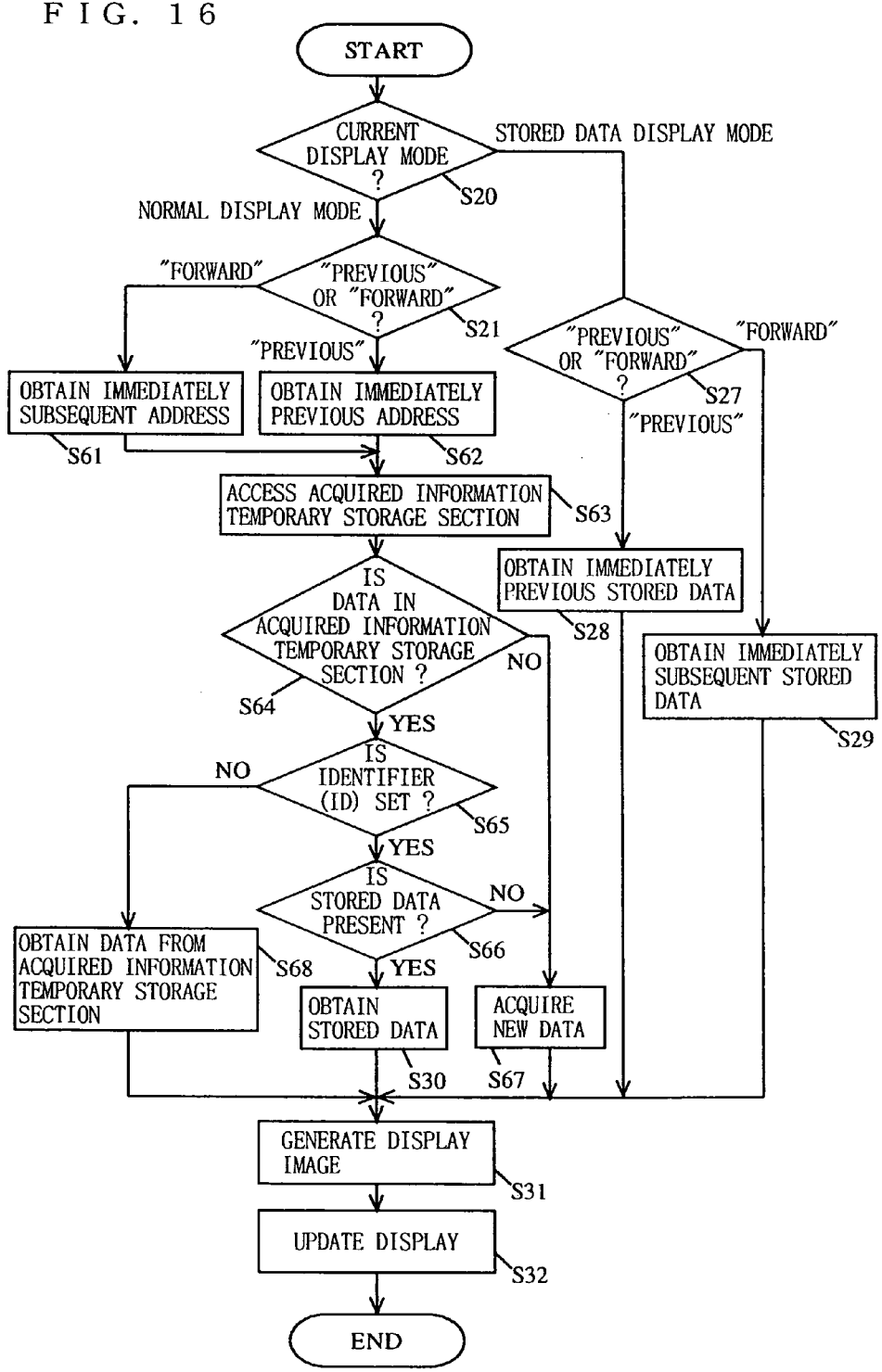
FIG. 16 is a flowchart illustrating an operation of the hypertext displaying apparatus 300 when receiving a history displaying instruction.

FIG. 16 is a flowchart illustrating an operation of the hypertext displaying apparatus 300 when receiving a history displaying instruction. In FIG. 16, any steps which are performed in a similar manner by the hypertext displaying apparatus 100 of the first embodiment will be denoted by the same step numbers as those used in FIG. 9 in order to simplify the descriptions thereof. Hereinafter, with reference to FIG. 16, the operation of the hypertext displaying apparatus 300 when receiving a history displaying instruction will be described.

First, upon receiving a history displaying instruction, the processing section 304 determines whether the current display mode is the stored data display mode or the normal display mode (step S20). If the current display mode is determined to be the stored data display mode, the processing section 304 reads necessary stored data from the stored information storage section 111 (steps S27 to 29), and instructs the display image generation section 106 to generate display data based on the stored data which has been read.

On the other hand, if the current display mode is determined to be the normal display mode, the processing section 304 determines whether the history displaying instruction given by the user is a "previous content" instruction or a "forward content" instruction (step S21). If the instruction given by the user is a "previous content" instruction, the processing section 304 accesses the history information storage section 310 to obtain an acquisition source URI of hypertext data which lies immediately previous to the currently-displayed hypertext data (step S62), and proceeds to the operation of step S63. On the other hand, if the instruction given by the user is a "forward content" instruction, the processing section 304 accesses the history information storage section 310 to obtain an acquisition source URI of the hypertext data which lies immediately subsequent to the currently-displayed hypertext data (step S61), and proceeds to the operation of step S63.

At step S63, the processing section 304 accesses the acquired information temporary storage section 312 for information which is set with respect to the aforementioned URI (step S63). Next, the processing section 304 determines whether or not hypertext data corresponding to the URI is stored in the acquired information temporary storage section 312 (step S64). If such hypertext data is stored, the processing section 304 proceeds to the operation of step S65. On the other hand, if no such hypertext data is stored, the processing section 304 proceeds to the operation of step S67. At Step S65, the processing section 304 determines whether or not an identifier (ID) is set in association with the URI. If no such identifier (ID) is set, the processing section 304 proceeds to the operation of step S68 to obtain hypertext data corresponding to the URI from the acquired information temporary storage section 312, and instructs the display image generation section 106 to generate display data based on the obtained hypertext data. On the other hand, if such an identifier (ID) is set, the processing section 304 proceeds to the operation of step S66, and accesses the stored information storage section 111 to determine whether or not any stored data corresponding to the identifier (ID) is stored in the stored information storage section 111. The determination of the stored data at step S66 is similar to that according to the first embodiment (see step 25 in FIG. 9).

If it is determined at step S66 that relevant stored data is stored, the processing section 304 obtains the stored data corresponding to the identifier (ID) (step S30), and instructs the display image generation section 106 to generate display data based on the obtained stored data. On the other hand, if no such stored data is stored, the processing section 304 instructs the transmission/reception section 103 to download hypertext data corresponding to the URI (step S67), and instructs the display image generation section 106 to generate display data based on the downloaded hypertext data.

Upon receiving the instruction from the processing section 103, the display image generation section 106 generates display data (step S31), causes the display/output section 107 to display and/or output the content represented by the hypertext data (step S32), thereby ending the processing.

Thus, in accordance with the hypertext displaying apparatus 300 of the third embodiment, when a link destination indicated in currently-displayed stored data is designated by a user under the stored data display mode, a URI of the originally-displayed stored data in which the link destination is indicated (i.e., the "source content") is registered in the history information storage section 310, and the URI and an associated identifier (ID) are registered in the acquired information temporary storage section 312. As a result, when a history displaying instruction such as a "previous content" or "forward content" instruction, etc., is given, it is possible to locate the stored area of the originally-displayed stored data by checking the identifier (ID) which is stored in the acquired information temporary storage section 312, thereby allowing the originally-displayed stored data to be redisplayed. Thus, a hypertext displaying apparatus can be provided which, after a user designates a link destination indicated in stored data in order to acquire and display new data at the link destination from a server device, still allows the originally-displayed stored data to be easily redisplayed.

No stored data may be found that matches the stored data to be displayed in response to a history manipulation (e.g., a "previous content" or "forward content" instruction) because the data may have been deleted in response to a user instruction, etc. In such a situation, however, the hypertext displaying apparatus 300 again downloads hypertext data at the acquisition source URI from a server device, which will presumably be identical or similar to the stored data that would have been redisplayed. Thus, the originally-displayed stored data can be redisplayed with practical certainty.

The third embodiment illustrates an example where the processing section 304 retrieves data which is stored in the acquired information temporary storage section 312 in the case the data to be displayed in response to a history manipulation is not stored data. Alternatively, the hypertext displaying apparatus may be arranged so that hypertext data is newly downloaded from a WWW server 18 to be displayed on the screen in such cases.

Fourth Embodiment

Figure 17:
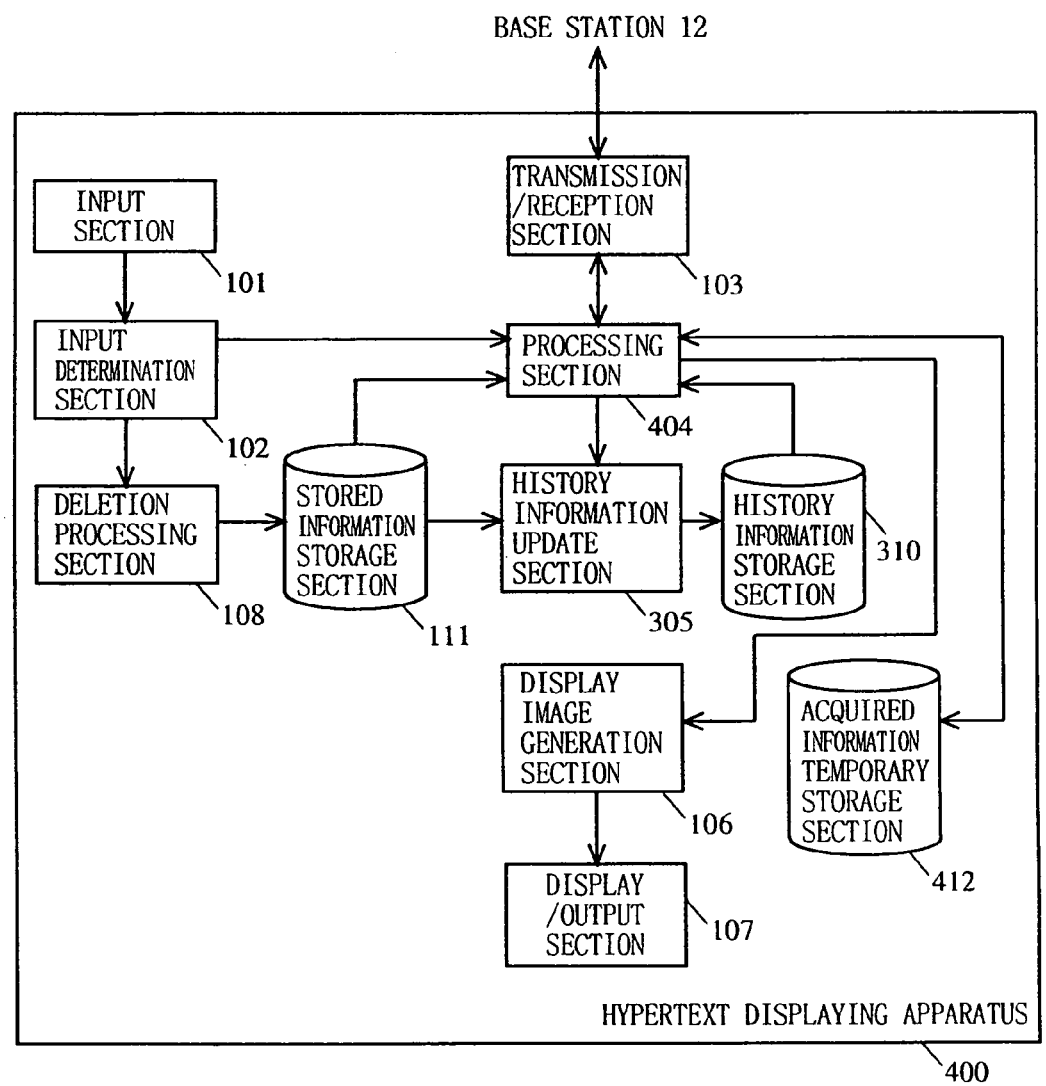
FIG. 17 is a diagram illustrating a functional construction of a hypertext displaying apparatus 400 according to a fourth embodiment of the present invention.

Hereinafter, a hypertext displaying apparatus according to a fourth embodiment of the present invention will be described. See FIG. 1 and FIG. 2, respectively, for the overall structure of a mobile communication system employing a mobile apparatus implementing the hypertext displaying apparatus according to the fourth embodiment and the hardware structure of the mobile apparatus itself, which are similar to those described in the first embodiment. FIG. 17 is a functional block diagram illustrating the hypertext displaying apparatus 400 according to the fourth embodiment of the present invention. In FIG. 17, any elements having similar functions to their counterparts of the hypertext displaying apparatuses 100 and 300 according to the first and third embodiments will be denoted by like reference numerals, and the descriptions thereof will be omitted. In FIG. 17, the hypertext displaying apparatus 400 includes a processing section 404 and an acquired information temporary storage section 412, as distinct from the processing sections 101 and 301 and the acquired information temporary storage sections 112 and 312 shown in FIGS. 3 and 12, respectively.

The format of the data which is stored in the acquired information temporary storage section 412 according to the fourth embodiment is similar to the format of the data which is stored in the acquired information temporary storage section 112 according to the first embodiment. However, unlike in the first embodiment, the acquired information temporary storage section 112 according to the fourth embodiment also retains stored data as instructed from the processing section 404, as described below.

As in the first embodiment, the processing section 404 includes a function (not shown) which stores a current display mode and a function (not shown) which stores a URI and an identifier (ID) of any stored data which has been sent to the display image generation section 106.

If a new content acquisition instruction is received under the stored data display mode, the processing section 404 instructs the transmission/reception section 103 to download new hypertext data, sends the downloaded new hypertext data to the display image generation section 106, and sends a URI of the new content and a URI of the stored data which has hitherto been displayed to the history information update section 305. In this case, the processing section 404 sends the hitherto-displayed stored data as well as the URI and an identifier (ID) thereof to the acquired information temporary storage section 412. The fourth embodiment differs from the third embodiment in that the stored data itself is sent to the acquired information temporary storage section 412.

If a history displaying instruction, in particular a "previous content" instruction is received, the processing section 404 obtains from the history information storage section 310 an acquisition source URI which lies immediately previous to the URI of the currently-displayed content, and obtains hypertext data corresponding to the URI from the acquired information temporary storage section 412. If there is no hypertext data corresponding to the URI in the acquired information temporary storage section 412, the processing section 404 instructs the transmission/reception section 103 to download the hypertext data. The foregoing operation applies mutatis mutandis to a "forward content" instruction.

The operation of the processing section 404 when receiving any other instructions is similar to that of the processing section 303 according to the third embodiment, and the descriptions thereof are omitted.

Figure 18:
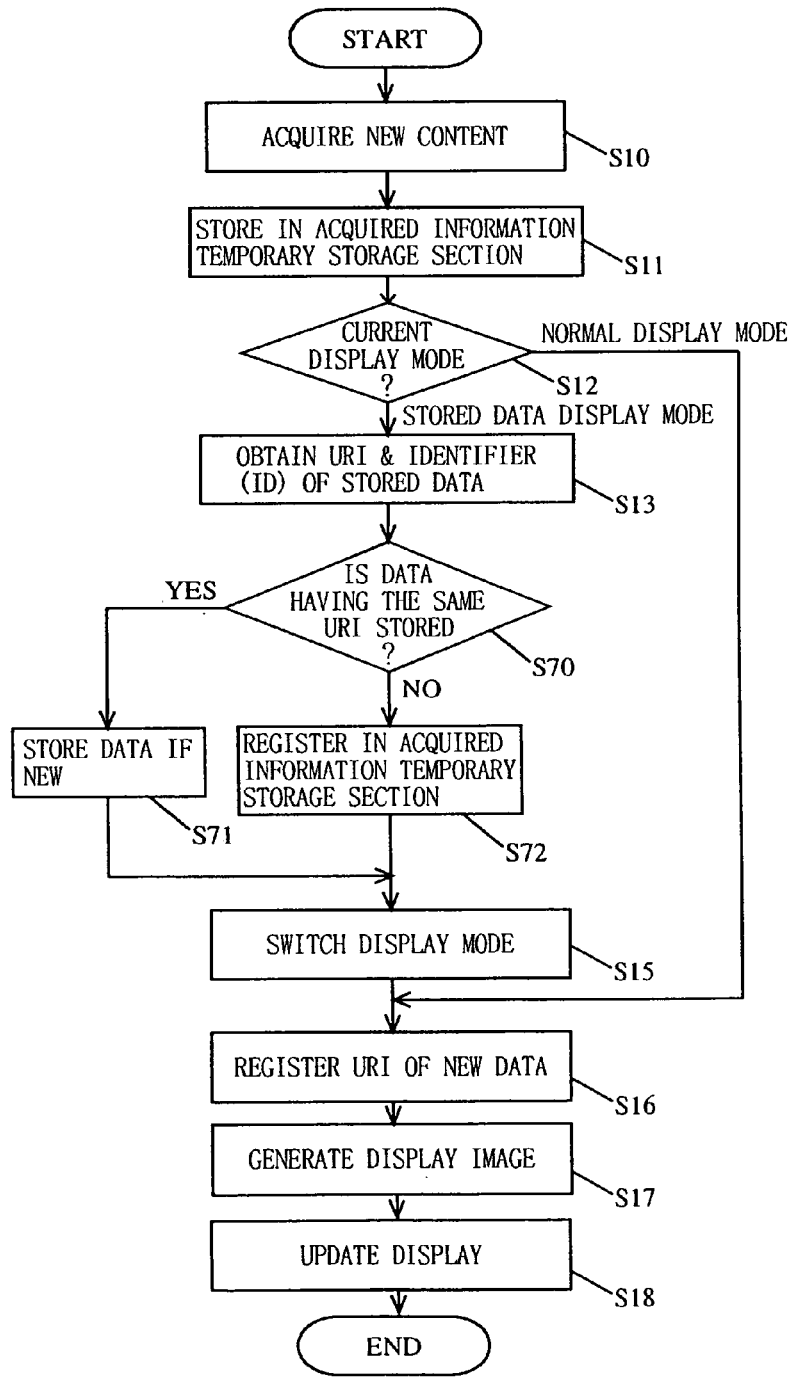
FIG. 18 is a flowchart illustrating an operation of the hypertext displaying apparatus 400 when receiving a new content acquisition instruction.

FIG. 18 is a flowchart illustrating an operation of the hypertext displaying apparatus 400 when receiving a new content acquisition instruction. In FIG. 18, any steps which are performed in a similar manner by the hypertext displaying apparatus 100 of the first embodiment will be denoted by the same step numbers as those used in FIG. 8 in order to simplify the descriptions thereof. Hereinafter, with reference to FIG. 18, the operation of the hypertext displaying apparatus 400 when receiving a new content acquisition instruction will be described.

First, in accordance with a user instruction, the processing section 404 instructs the transmission/reception section 103 to download hypertext data representing a new content (step S10), stores the downloaded hypertext data in the acquired information temporary storage section 412 (step S11), and determines whether the current display mode is the normal display mode or the stored data display mode (step S12).

If the current display mode is determined to be the normal display mode, the processing section 404 proceeds to the operation of step S16. On the other hand, if the current display mode is determined to be the stored data display mode, the processing section 404 obtains a URI and an identifier (ID) of the currently-displayed stored data (step S13). Next, the processing section 404 determines whether or not any hypertext data having the same URI as the URI of the currently-displayed stored data is stored in the acquired information temporary storage section 412 (step S70).

If hypertext data having the same URI is stored, and only if the condition that the currently-displayed stored data is newer than the data stored in the acquired information temporary storage section 412, then the processing section 404 stores the currently-displayed stored data as well as the URI and an identifier (ID) thereof in the acquired information temporary storage section 412 (step S71); thereafter, the processing section 404 proceeds to the operation of step S15. On the other hand, if no hypertext data having the same URI is stored, the processing section 404 stores the currently-displayed stored data as well as the URI and the identifier (ID) thereof in the acquired information temporary storage section 412 (step S72), and proceeds to the operation of step S15.

The operation of step S15 and the subsequent steps are similar to those according to the first embodiment, and the descriptions thereof are omitted.

Figure 19:
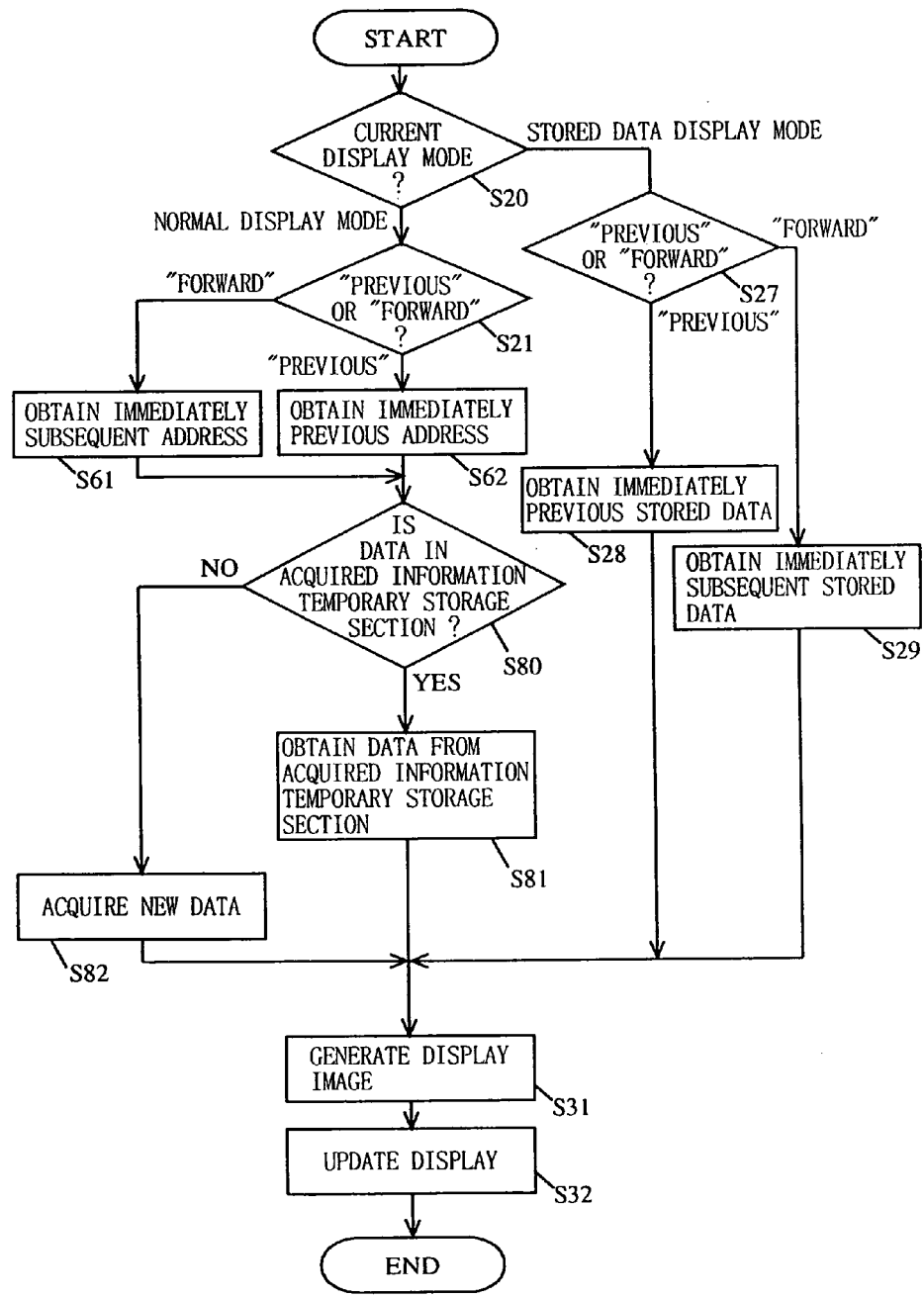
FIG. 19 is a flowchart illustrating an operation of the hypertext displaying apparatus 400 when receiving a history displaying instruction.
Figure 20:
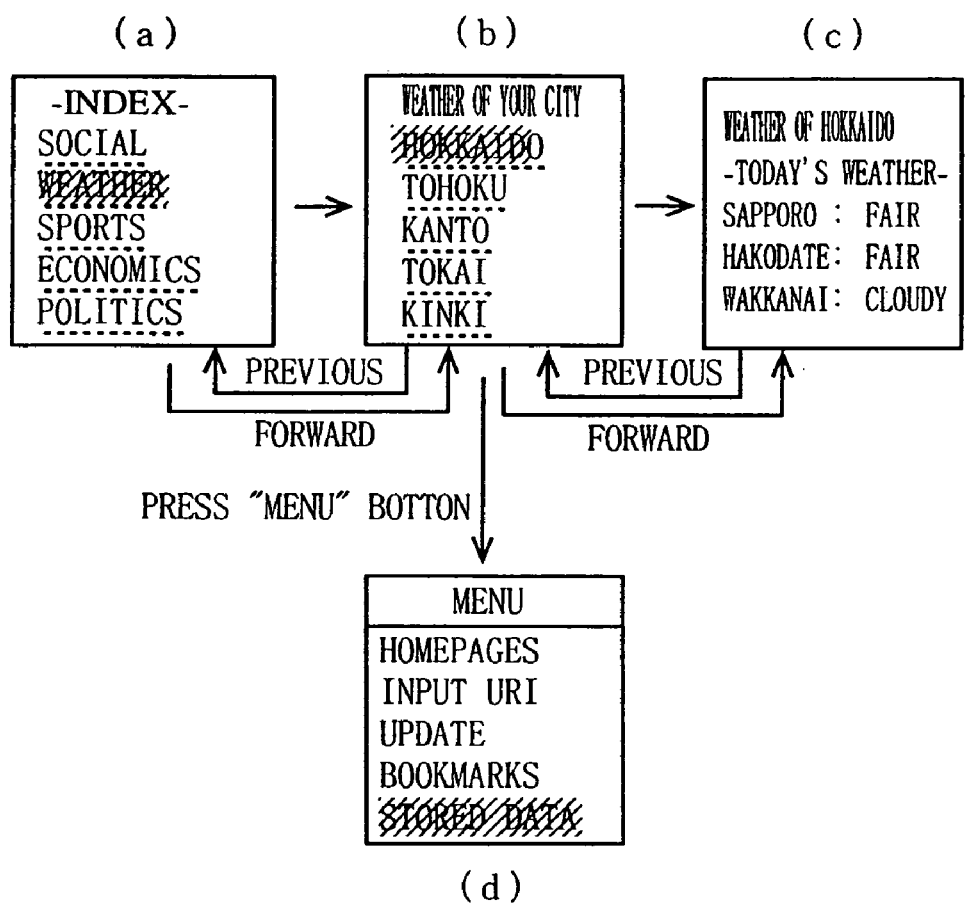
FIG. 20 is a diagram illustrating a transition of exemplary images which may be displayed by a conventional hypertext displaying apparatus implemented by means of a mobile terminal.
Figure 21:
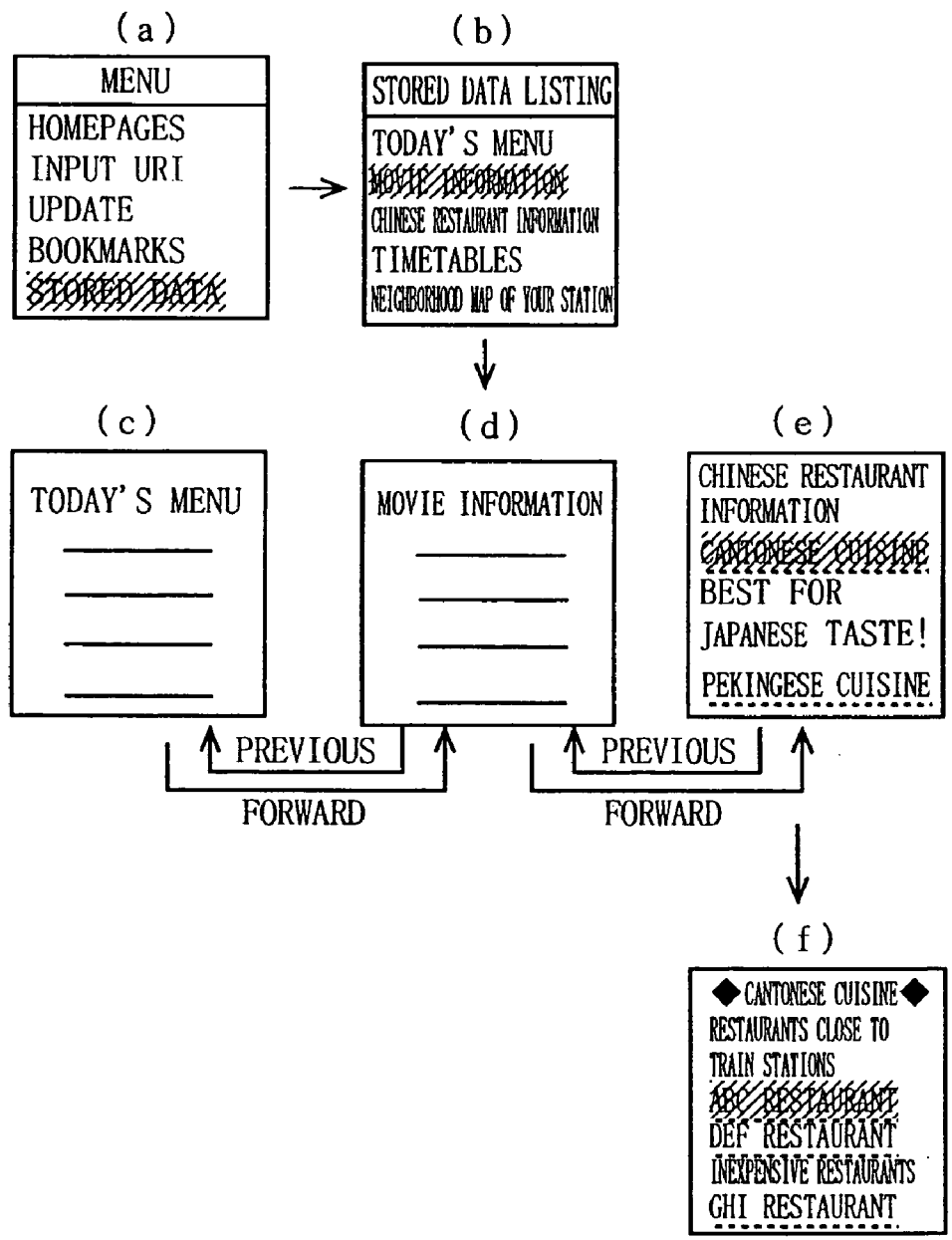
FIG. 21 is a diagram illustrating a transition of exemplary images displayed by the conventional hypertext displaying apparatus when stored data is read.
Figure 22:
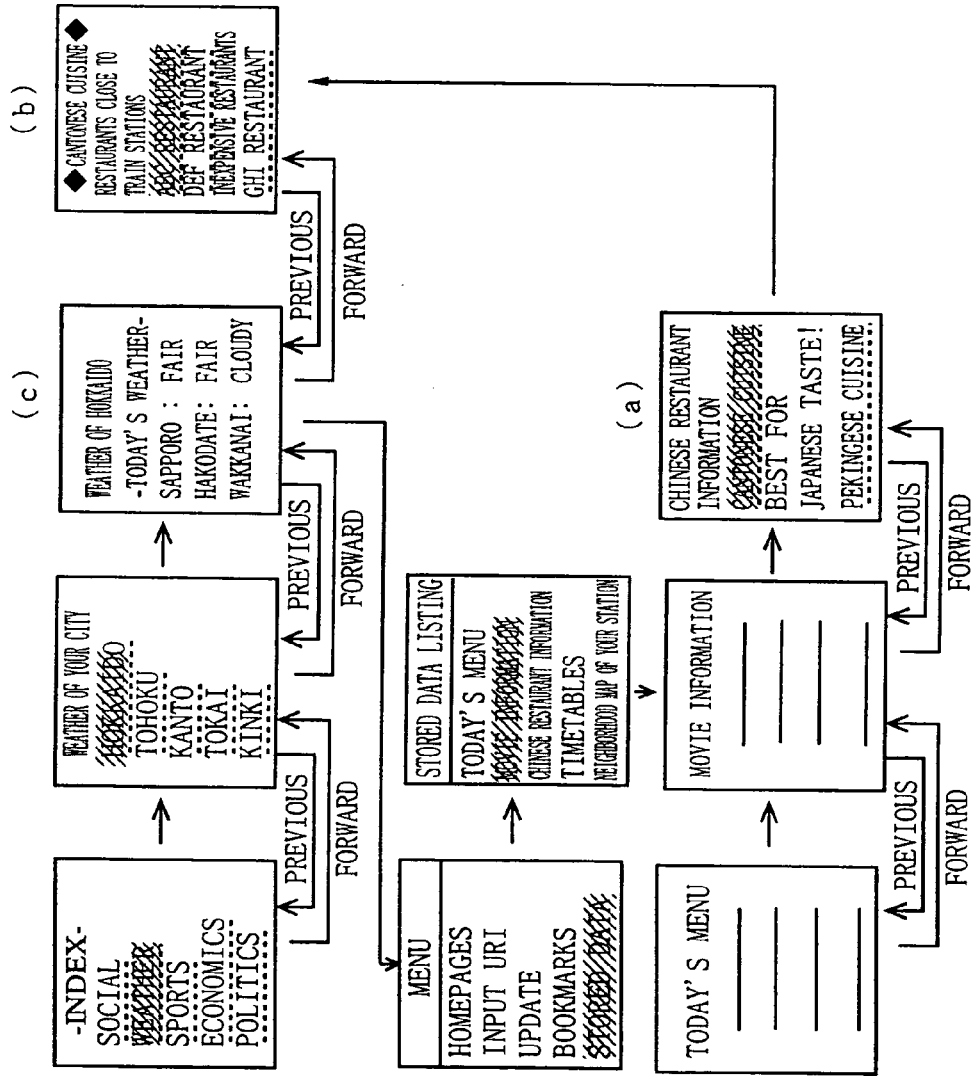
FIG. 22 is a diagram illustrating a transition of exemplary images displayed by the conventional hypertext displaying apparatus which describes a problem associated therewith.

FIG. 19 is a flowchart illustrating an operation of the hypertext displaying apparatus 400 when receiving a history displaying instruction. In FIG. 19, any steps which are performed in a similar manner by the hypertext displaying apparatus 100 or 300 of the first or third embodiment will be denoted by the same step numbers as those used in FIG. 9 or FIG. 16 in order to simplify the descriptions thereof. Hereinafter, with reference to FIG. 19, the operation of the hypertext displaying apparatus 400 when receiving a history displaying instruction will be described.

First, upon receiving a history displaying instruction, the processing section 404 determines whether the current display mode is the stored data display mode or the normal display mode (step S20). If the current display mode is determined to be the stored data display mode, operations similar to those according to the first embodiment are performed (steps S27 to S29), and the descriptions thereof are omitted.

On the other hand, if the current display mode is determined to be the normal display mode, the processing section 404 obtains a necessary URI from the history information storage section 310 (steps S21, S61 to S62). Next, the processing section 404 determines whether or not any hypertext data corresponding to the URI is in the acquired information temporary storage section 412 (step S80).

If such hypertext data is found in the acquired information temporary storage section 412, the processing section 404 obtains the hypertext data corresponding to the URI from the acquired information temporary storage section 412 (step S81), and instructs the display image generation section 106 to generate display data based thereupon. On the other hand, if no such hypertext data is found in the acquired information temporary storage section 412, the processing section 404 instructs the transmission/reception section 103 to download hypertext data corresponding to the URI (step S82), and instructs the display image generation section 106 to generate display data based on the downloaded hypertext data.

Upon receiving the instruction from the processing section 103, the display image generation section 106 generates display data (step S31), causes the display/output section 107 to display and/or output the content represented by the hypertext data (step S32), thereby ending the processing.

Thus, in accordance with the hypertext displaying apparatus 400 of the fourth embodiment, when a link destination indicated in currently-displayed stored data is designated by a user under the stored data display mode, the originally-displayed stored data in which the link destination is indicated (i.e., the source content") is stored in the acquired information temporary storage section 412. As a result, when a history displaying instruction such as a "previous content" or "forward content" instruction, etc., is given, the stored data in the acquired information temporary storage section 412 can be retrieved to allow the originally-displayed stored data to be redisplayed. Thus, a hypertext displaying apparatus can be provided which, after a user designates a link destination indicated in stored data in order to acquire and display new data at the link destination from a server device, still allows the originally-displayed stored data to be easily redisplayed.

Moreover, in accordance with the hypertext displaying apparatus 400 of the fourth embodiment, once-displayed stored data is stored in the acquired information temporary storage section 412. As a result, even if stored data which is designated to be displayed by a history manipulation has been deleted in accordance with a user request, etc., it is possible to recall the deleted stored data from the acquired information temporary storage section 412. Therefore, there is no need to newly download hypertext data when already-deleted stored data is desired.

Although the process of sending stored data to be stored in the acquired information temporary storage section 412 is handled by the processing section 404 according to the fourth embodiment, the present invention is not limited thereto. Alternatively, the hypertext displaying apparatus 400 may be arranged so that the history update section 305 receives stored data from the processing section 404 and sends the received stored data to be stored in the acquired information temporary storage section 412.

While the invention has been described in detail, the foregoing description is in all aspects illustrative and not restrictive. It is understood that numerous other modifications and variations can be devised without departing from the scope of the invention.

What is claimed is:

1. A hypertext displaying apparatus for downloading hypertext data via a network, and displaying a content represented by the hypertext data, comprising:
   a non-transitory memory device storing a program; and
   a processing device configured to execute the program and cause the hypertext displaying apparatus to operate as:
   a download section configured to download, when a link destination is selected, hypertext data at the selected link destination, and store the downloaded hypertext data in a temporary storage section;
   a stored data storage section configured to store hypertext data selected from among the hypertext data having been downloaded and stored in the temporary storage section by the download section;
   a list display section configured to display a list of stored data in the stored data storage section;
   a select section configured to select a stored data from the list displayed by the list display section;
   a display section configured to display a content represented by hypertext data newly downloaded by the download section, or display a content represented by the stored data selected by the select section;
   a displaying history storage section configured to store, as a displaying history, an order in which at least one content represented by hypertext data newly downloaded by the download section is displayed by the display section; and
   a redisplaying order control section configured to control, in accordance with the displaying history stored in the displaying history storage section, an order in which the contents are redisplayed by the display section, wherein
   when a content represented by a first stored data in the stored data storage section is displayed, and a link destination indicated within the content represented by the first stored data is selected, the displaying history storage section adds the content represented by the first stored data to the displaying history, and
   when a content at the selected link destination is displayed, and an instruction for displaying a content preceding the content at the selected link destination is issued, the redisplaying order control section allows contents to be redisplayed by the display section in a sequential manner in accordance with an order of the displaying history, going back, at least to the content represented by the first stored data.

2. The hypertext displaying apparatus according to claim 1, wherein the list display section displays a list of titles of the stored data in the stored data storage section.

3. The hypertext displaying apparatus according to claim 2, wherein the stored data storage section stores an acquisition source address indicating an address of the hypertext data on the network.

4. The hypertext displaying apparatus according to claim 3, wherein
when the content represented by the first stored data in the stored data storage section is displayed, and a content represented by a second stored data in the stored data storage section is displayed next, and a link destination indicated within the content represented by the second stored data is selected, the displaying history storage section adds the content represented by the second stored data to the displaying history without adding the content represented by the first stored data to the displaying history, and
when a content at the selected link destination is displayed, and an instruction for displaying a content preceding the content at the selected link destination is issued, the redisplaying order control section allows contents to be redisplayed by the display section in a sequential manner in accordance with an order of the displaying history, going back, at least to the content represented by the second stored data.

5. The hypertext displaying apparatus according to claim 3, further comprising stored data deletion section configured to delete stored data in the stored data storage section, wherein
when the first stored data to be redisplayed has been deleted by the stored data deletion section, the download section newly downloads hypertext data by using the acquisition source address stored in the stored data storage section, and
the display section displays a content represented by the newly downloaded hypertext data.

6. A hypertext displaying method for downloading hypertext data via a network, and displaying a content represented by the hypertext data, the hypertext displaying method comprising:
downloading, when a link destination is selected, hypertext data at the selected link destination, and storing the downloaded hypertext data in a temporary storage section;
storing, in a stored data storage section, hypertext data selected from among the hypertext data having been downloaded and stored in the temporary storage section in the downloading of the hypertext data;
displaying a list of stored data in the stored data storage section;
selecting a stored data from the list displayed in the displaying of the list;
displaying a content represented by hypertext data newly downloaded in the downloading of the hypertext data, or displaying a content represented by the stored data selected in the selecting;
storing, as a displaying history, an order in which at least one content represented by hypertext data newly downloaded in the downloading of the hypertext data is displayed in the displaying of the content; and
controlling, in accordance with the displaying history stored in the storing of the displaying history, an order in which the contents are redisplayed by the display section, wherein
when a content represented by a first stored data in the stored data storage section is displayed, and a link destination indicated within the content represented by the first stored data is selected, the storing of the displaying history adds the content represented by the first stored data to the displaying history, and
when a content at the selected link destination is displayed, and an instruction for displaying a content preceding the content at the selected link destination is issued, the controlling of the order in which contents are redisplayed allows contents to be redisplayed in the displaying of the content in a sequential manner in accordance with an order of the displaying history, going back, at least to the content represented by the first stored data.

7. The hypertext displaying method according to claim 6, wherein the displaying of the list displays a list of titles of the stored data in the stored data storage section.

8. The hypertext displaying method according to claim 7, wherein the stored data storage section stores an acquisition source address indicating an address of the hypertext data on the network.

9. The hypertext displaying method according to claim 8, wherein
when the content represented by the first stored data in the stored data storage section is displayed, and a content represented by a second stored data in the stored data storage section is displayed next, and a link destination indicated within the content represented by the second stored data is selected, the storing of the displaying history adds the content represented by the second stored data to the displaying history without adding the content represented by the first stored data to the displaying history, and
when a content at the selected link destination is displayed, and an instruction for displaying a content preceding the content at the selected link destination is issued, the controlling of the order in which contents are redisplayed allows contents to be redisplayed in the displaying of the content in a sequential manner in accordance with an order of the displaying history, going back, at least to the content represented by the second stored data.

10. The hypertext displaying method according to claim 8, further comprising deleting stored data in the stored data storage section, wherein
when the first stored data to be redisplayed has been deleted by the deleting of the stored data, the downloading of the hypertext data newly downloads hypertext data by using the acquisition source address stored in the stored data storage section, and
the displaying of the content displays a content represented by the newly downloaded hypertext data.

* * * * *